(12) United States Patent
Attar et al.

(10) Patent No.: US 8,194,598 B2
(45) Date of Patent: *Jun. 5, 2012

(54) METHOD AND SYSTEM FOR A DATA TRANSMISSION IN A COMMUNICATION SYSTEM

(75) Inventors: Rashid Ahmed Attar, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1132 days.

This patent is subject to a terminal disclaimer.

(21) Appl. No.: 11/512,881

(22) Filed: Aug. 29, 2006

(65) Prior Publication Data

US 2006/0291389 A1   Dec. 28, 2006

Related U.S. Application Data

(63) Continuation of application No. 10/313,553, filed on Dec. 6, 2002, now Pat. No. 7,139,274.

(60) Provisional application No. 60/405,422, filed on Aug. 23, 2002.

(51) Int. Cl.
    *H04W 4/00* (2009.01)
(52) U.S. Cl. ......... 370/329; 370/436; 370/437; 455/450
(58) Field of Classification Search ................. None
    See application file for complete search history.

(56) References Cited

U.S. PATENT DOCUMENTS

| | | | |
|---|---|---|---|
| 4,901,307 A | 2/1990 | Gilhousen et al. | |
| 5,056,109 A | 10/1991 | Gilhousen et al. | |
| 5,103,459 A | 4/1992 | Gilhousen et al. | |
| 5,267,261 A | 11/1993 | Blakeney, II et al. | |
| 5,345,439 A | 9/1994 | Marston | |
| 5,504,773 A | 4/1996 | Padovani et al. | |
| 5,515,379 A * | 5/1996 | Crisler et al. | 370/347 |
| 5,594,738 A * | 1/1997 | Crisler et al. | 370/347 |
| 5,646,937 A | 7/1997 | Nakano et al. | |
| 5,933,462 A | 8/1999 | Viterbi et al. | |
| 5,933,787 A | 8/1999 | Gilhousen et al. | |
| 6,031,824 A | 2/2000 | Azuma et al. | |
| 6,101,168 A | 8/2000 | Chen et al. | |

(Continued)

FOREIGN PATENT DOCUMENTS

EP    1083698    3/2001

(Continued)

OTHER PUBLICATIONS

Viterbi et al., "Soft Handoff Extends CDMA Cell Coverage and Increases Reverse Link Capacity" *IEEE Journal on Selected Areas in Communications*, vol. 12, No. 8, Oct. 1994, pp. 1281-1288.

(Continued)

*Primary Examiner* — Bob Phunkulh
(74) *Attorney, Agent, or Firm* — Charles E. Eggers

(57) ABSTRACT

Methods and apparatus for a data transmission in a communication system are disclosed. Each of a subset of plural access terminals desiring to transmit user data in an interval transmits a request to transmit in the interval to an access network. The access network makes a decision to schedule at least one of the subset of the plural access terminals to transmit in the interval in accordance with the request. At least one access point of the access network transmits the decision to the plural access terminals.

37 Claims, 12 Drawing Sheets

U.S. PATENT DOCUMENTS

| | | | |
|---|---|---|---|
| 6,192,249 B1 | 2/2001 | Padovani | |
| 6,205,129 B1 | 3/2001 | Esteves et al. | |
| 6,229,795 B1 | 5/2001 | Pankaj et al. | |
| 6,425,105 B1 | 7/2002 | Piirainen et al. | |
| 6,426,971 B1 | 7/2002 | Wu et al. | |
| 6,430,163 B1 | 8/2002 | Mustajarvi | |
| 6,456,605 B1 | 9/2002 | Laakso et al. | |
| 6,574,211 B2 | 6/2003 | Padovani et al. | |
| 6,678,257 B1 | 1/2004 | Vijayan et al. | |
| 6,694,469 B1 | 2/2004 | Jalali et al. | |
| 6,801,513 B1 * | 10/2004 | Gibbons et al. | 370/337 |
| 6,807,426 B2 | 10/2004 | Pankaj | |
| 6,836,666 B2 | 12/2004 | Gopalakrishnan et al. | |
| 6,937,640 B2 * | 8/2005 | Yun et al. | 375/141 |
| 7,079,584 B2 | 7/2006 | Feher | |
| 7,116,983 B2 | 10/2006 | Lan et al. | |
| 7,133,456 B2 | 11/2006 | Feher | |
| 7,283,482 B2 | 10/2007 | Koo | |
| 7,391,715 B2 | 6/2008 | Lee et al. | |
| 2001/0053670 A1 | 12/2001 | Voyer | |
| 2002/0041566 A1 | 4/2002 | Yang et al. | |
| 2002/0082021 A1 | 6/2002 | Chen et al. | |
| 2002/0085502 A1 | 7/2002 | Chheda et al. | |
| 2002/0105918 A1 | 8/2002 | Yamada et al. | |
| 2002/0141435 A1 * | 10/2002 | Newberg et al. | 370/442 |
| 2002/0168944 A1 * | 11/2002 | Terry et al. | 455/67.1 |
| 2004/0203819 A1 * | 10/2004 | Das et al. | 455/452.1 |
| 2005/0254465 A1 | 11/2005 | Lundby et al. | |

FOREIGN PATENT DOCUMENTS

| | | |
|---|---|---|
| EP | 1 098 542 A | 5/2001 |
| EP | 1119213 | 7/2001 |
| EP | 1128574 | 8/2001 |
| EP | 1139581 | 10/2001 |
| EP | 1 229 671 A | 8/2002 |
| EP | 1249955 | 10/2002 |
| JP | 10190621 | 7/1998 |
| KR | 2002-0039503 | 5/2002 |
| KR | 2002-0061672 | 7/2002 |
| KR | 2002-0034047 | 8/2002 |
| RU | 2142672 | 12/1999 |
| WO | 0163778 | 8/2001 |
| WO | 0165869 | 9/2001 |
| WO | WO 02/39595 A2 | 5/2002 |
| WO | WO0247408 | 6/2002 |
| WO | 2004084450 | 9/2004 |

OTHER PUBLICATIONS

3GPP 3G TS 25.211 V3.2.0 (Mar. 2000) "3rd Generation Partnership Project; Technical Specification Group Radio Access Network; Physical channels and mapping of transport channels onto physical channels (RDD) (Release 1999)".

3GPP 3G TS 25.212 V3.2.0 (Mar. 2000) "3rd Generation Partnership Project; Technical Specification Group Radio Access Network; Multiplexing and channel coding (FDD) (Release 1999)".

3GPP 3G TS 25.213 V3.2.0 (Mar. 2000) "3rd Generation Partnership Project; Technical Specification Group Radio Access Network; Spreading and modulation (FDD) (Release 1999)".

3GPP, 3G TS 25.214 V3.2.0 (Mar. 2000) "3rd Generation Partnership Project; Technical Specification Group Radio Access Network; Physical layer procedures (FDD) (Release 1999)".

Attar, R. A., et al., "A Reverse Link Outer-Loop Power Control Algorithm for CDMA2000 1xEV Systems" ICC 2002. 2002 IEEE International Conference on Communications. Conference Proceedings. New York, NY, Apr. 28-May 2, 2002, IEEE International Conference on Communications, New York, NY: IEEE, US vol. 1 of 5 Apr. 28, 2002 pp. 573-578, XP010589559, ISBN: 0-7803-7400-2.

European Search Report—EP03793306—Search Authority—Munich Patent Office—May 29, 2006.

Hsieh, et al. "Towards a Hybrid Network Model for Wireless Packet Data Networks" Computers and Communications, 2002. Proceedings. ISCC 2002. Seventh International Symposium on Jul. 1-4, 2002 Piscataway, NJ, USA, IEEE, Jul. 1, 2002, pp. 264-271, XP010696.

International Search Report—PCT/US03/026369, International Search Authority—European Patent Office—Mar. 12, 2004.

International Search Report—PCT/US04/037405, International Search Authority—European Patent Office—Mar. 23, 2005.

IS-856 "CDMA2000 High Rate Packet Data Air Interface" 3GPP2 C.S0024 Version 2.0, Oct. 27, 2000.

TIA/EIA/IS-95 Mobile Station-Base Station Compatibility Standard for Dual-Mode Wide-Band Spread Spectrum Cellular System.

TIA/EIA/IS-707-A.8. "Data Service Options for Spread Spectrum Systems: Radio Link Protocol Type 2" PN-4145.8 Ballot Resolution Version Mar. 1999.

TR-45.5 Physical Layer Standard for CDMA2000 Spread Spectrum Systems Release C (The IS-2000 Standard) 3GPP2 C.S0002-C Version 1.0, May 28, 2002.

* cited by examiner

METHOD AND SYSTEM FOR A DATA TRANSMISSION IN A COMMUNICATION SYSTEM

CLAIM OF PRIORITY UNDER 35 U.S.C. §119 & §120

The present application for patent is a Continuation and claims priority to patent application Ser. No. 10/313,553, entitled "Method and System for a Data Transmission in a Communication System," filed Dec. 6, 2002, now U.S. Pat. No. 7,139,274 now allowed, which claims priority from U.S. Application No. 60/405,422, filed Aug. 23, 2002, entitled "Method and System for a Data Transmission Over a Reverse Link in a Communication System," and assigned to the assignee hereof and hereby expressly incorporated by reference herein.

BACKGROUND

1. Field

The present invention relates to communications in a wire-line or a wireless communication system. More particularly, the present invention relates to a method and system for a data transmission in such a communication system.

2. Background

Communication systems have been developed to allow transmission of information signals from an origination station to a physically distinct destination station. In transmitting an information signal from the origination station over a communication channel, the information signal is first converted into a form suitable for efficient transmission over the communication channel. Conversion, or modulation, of the information signal involves varying a parameter of a carrier wave in accordance with the information signal in such a way that the spectrum of the resulting modulated carrier wave is confined within the communication channel bandwidth. At the destination station, the original information signal is reconstructed from the modulated carrier wave received over the communication channel. In general, such a reconstruction is achieved by using an inverse of the modulation process employed by the origination station.

Modulation also facilitates multiple-access, i.e., simultaneous transmission and/or reception, of several signals over a common communication channel. Multiple-access communication systems often include a plurality of remote subscriber units requiring intermittent access of relatively short duration rather than continuous access to the common communication channel. Several multiple-access techniques are known in the art, such as time division multiple-access (TDMA), and frequency division multiple-access (FDMA). Another type of a multiple-access technique is a code-division multiple-access (CDMA) spread spectrum system that conforms to the "TIA/EIA/IS-95 Mobile Station-Base Station Compatibility Standard for Dual-Mode Wide-Band Spread Spectrum Cellular System," hereinafter referred to as the IS-95 standard. The use of CDMA techniques in a multiple-access communication system is disclosed in U.S. Pat. No. 4,901,307, entitled "SPREAD SPECTRUM MULTIPLE-ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the present assignee.

A multiple-access communication system may be wireless or wire-line and may carry voice traffic and/or data traffic. An example of a communication system carrying both voice and data traffic is a system in accordance with the IS-95 standard, which specifies transmitting voice and data traffic over a communication channel. A method for transmitting data in code channel frames of fixed size is described in detail in U.S. Pat. No. 5,504,773, entitled "METHOD AND APPARATUS FOR THE FORMATTING OF DATA FOR TRANSMISSION," assigned to the present assignee. In accordance with the IS-95 standard, the data traffic or voice traffic is partitioned into code channel frames that are 20 milliseconds wide with data rates as high as 14.4 Kbps. Additional examples of communication systems carrying both voice and data traffic comprise communication systems conforming to the "3rd Generation Partnership Project" (3GPP), embodied in a set of documents including Document Nos. 3G TS 25.211, 3G TS 25.212, 3G TS 25.213, and 3G TS 25.214 (the W-CDMA standard), or "TR-45.5 Physical Layer Standard for cdma2000 Spread Spectrum Systems" (the IS-2000 standard).

The term base station is an access network entity, with which subscriber stations communicate. With reference to the IS-856 standard, the base station is also referred to as an access point. Cell refers to the base station or a geographic coverage area served by a base station, depending on the context in which the term is used. A sector is a partition of a base station, serving a partition of a geographic area served by the base station.

The term "subscriber station" is used herein to mean the entity with which an access network communicates. With reference to the IS-856 standard, the subscriber station is also referred to as an access terminal. A subscriber station may be mobile or stationary. A subscriber station may be any data device that communicates through a wireless channel or through a wired channel, for example fiber optic or coaxial cables. A subscriber station may further be any of a number of types of devices including but not limited to PC card, compact flash, external or internal modem, or wireless or wireline phone. A subscriber station that is in the process of establishing an active traffic channel connection with a base station is said to be in a connection setup state. A subscriber station that has established an active traffic channel connection with a base station is called an active subscriber station, and is said to be in a traffic state.

The term access network is a collection of at least one base station (BS) and one or more base stations' controllers. The access network transports information signals between multiple subscriber stations. The access network may be further connected to additional networks outside the access network, such as a corporate intranet or the Internet, and may transport information signals between each base station and such outside networks.

In the above-described multiple-access wireless communication system, communications between users are conducted through one or more base stations. The term user refers to both animate and inanimate entities. A first user on one wireless subscriber station communicates to a second user on a second wireless subscriber station by conveying information signal on a reverse link to a base station. The base station receives the information signal and conveys the information signal on a forward link to the second subscriber station. If the second subscriber station is not in the area served by the base station, the base station routes the data to another base station, in whose service area the second subscriber station is located. The second base station then conveys the information signal on a forward link to the second subscriber station. The forward link refers to transmissions from a base station to a wireless subscriber station, and the reverse link refers to transmissions from a wireless subscriber station to a base station. Likewise, the communication can be conducted between a first user on a wireless subscriber station and a second user on a landline station. A base station receives the data from the first user on the wireless subscriber station on a reverse link, and routes the data through a public switched telephone network (PSTN) to the second user on a landline station. In many communication systems, e.g., IS-95, W-CDMA, and IS-2000, the forward link and the reverse link are allocated separate frequencies.

Study of voice traffic only services and data traffic only services revealed some substantial differences between the two types of services. One difference concerns delay in delivery of the information content. The voice traffic services impose stringent and fixed delay requirements. Typically, an overall one-way delay of a predetermined amount of voice traffic information, referred to as a speech frame, must be less than 100 ms. In contrast, the overall one-way data traffic delay may be a variable parameter, used to optimize the efficiency of the data traffic services provided by the communication system. For example, multi-user diversity, delay of data transmission until more favorable conditions, more efficient error correcting coding techniques, which require significantly larger delays than delays that can be tolerated by voice traffic services, and other techniques can be utilized. An exemplary efficient coding scheme for data is disclosed in U.S. Pat. No. 5,933,462, entitled "SOFT DECISION OUTPUT DECODER FOR DECODING CONVOLUTIONALLY ENCODED CODEWORDS," issued on Aug. 3, 1999, assigned to the present assignee.

Another significant difference between voice traffic services and data traffic services is that the former require a fixed and common grade of service (GOS) for all users. Typically, for digital communication systems providing voice traffic services, this requirement translates into a fixed and equal transmission rate for all users and a maximum tolerable value for the error rates of speech frames. In contrast, the GOS for data services may be different from user to user, and may be a variable parameter, whose optimization increases the overall efficiency of the data traffic service providing communication system. The GOS of a data traffic service providing communication system is typically defined as the total delay incurred in the transfer of a predetermined amount of data traffic information which may comprise, e.g., a data packet. The term packet is a group of bits, including data (payload) and control elements, arranged into a specific format. The control elements comprise, e.g., a preamble, a quality metric, and others known to one skilled in the art. Quality metric comprises, e.g., a cyclic redundancy check (CRC), a parity bit, and others known to one skilled in the art.

Yet, another significant difference between voice traffic services and data traffic services is that the former requires a reliable communication link. When a subscriber station, communicating voice traffic with a first base station, moves to the edge of the cell served by the first base station, the subscriber station enters a region of overlap with another cell served by a second base station. The subscriber station in such a region establishes a voice traffic communication with the second base station while maintaining a voice traffic communication with the first base station. During such a simultaneous communication, the subscriber station receives a signal carrying identical information from two base stations. Likewise, both of the base stations also receive signals carrying information from the subscriber station.

Such a simultaneous communication is termed soft hand-off. When the subscriber station eventually leaves the cell served by the first base station, and breaks the voice traffic communication with the first base station, the subscriber station continues the voice traffic communication with the second base station. Because soft handoff is a "make before break" mechanism, the soft handoff minimizes the probability of dropped calls. A method and system for providing a communication with a subscriber station through more than one base station during the soft handoff process are disclosed in U.S. Pat. No. 5,267,261, entitled "MOBILE ASSISTED SOFT HAND-OFF IN A CDMA CELLULAR TELEPHONE SYSTEM," assigned to the present assignee.

Softer handoff is a similar process whereby the communication occurs over at least two sectors of a multi-sector base station. The process of softer handoff is described in detail in U.S. Pat. No. 5,933,787, entitled "METHOD AND APPARATUS FOR PERFORMING HAND-OFF BETWEEN SECTORS OF A COMMON BASE STATION," issued on Aug. 3, 1999, assigned to the present assignee. Thus, both soft and softer handoff for voice services result in redundant transmissions from two or more base stations to improve reliability.

This additional reliability is not so important for data traffic communications because the data packets received in error can be retransmitted. Important parameters for data services are transmission delay required to transfer a data packet and the average throughput rate of the data traffic communication system. The transmission delay does not have the same impact in data communication as in voice communication, but the transmission delay is an important metric for measuring the quality of the data communication system. The average throughput rate is a measure of the efficiency of the data transmission capability of the communication system. Because of relaxed transmission delay requirement, the transmit power and resources used to support soft hand-off on the forward link can be used for transmission of additional data, thus, increasing average throughput rate by increasing efficiency.

The situation is different on the reverse link. Several base stations can receive the signal transmitted by a subscriber station. Because re-transmission of packets from a subscriber station requires additional power from a power limited source (a battery), it may be efficient to support soft handoff on the reverse link by allocating resources at several base stations to receive and process the data packets transmitted from the subscriber station. Such a utilization of soft handoff increases both coverage and reverse link capacity as discussed in a paper by Andrew J. Viterbi and Klein S. Gilhousen: "Soft Handoff Increases CDMA coverage and Increases Reverse Link Capacity," IEEE Journal on Selected Areas in Communications, Vol. 12, No. 8, October 1994. The term soft handoff is a communication between a subscriber station and two or more sectors, wherein each sector belongs to a different cell. In the context of the IS-95 standard, the reverse link communication is received by both sectors, and the forward link communication is simultaneously carried on the two or more sectors' forward links. In the context of the IS-856 standard, data transmission on the forward link is non-simultaneously carried out between one of the two or more sectors and the access terminal. Additionally, a softer handoff may be used for this purpose. The term softer handoff is a communication between a subscriber station and two or more sectors, wherein each sector belongs to the same cell. In the context of the IS-95 standard, the reverse link communication is received by both sectors, and the forward link communication is simultaneously carried on one of the two or more sectors' forward links. In the context of the IS-856 standard, data transmission on the forward link is non-simultaneously carried out between one of the two or more sectors and the access terminal.

It is well known that quality and effectiveness of data transfer in a wireless communication system is dependent on the condition of a communication channel between a source terminal and a destination terminal. Such a condition, expressed as, for example, a signal-to-interference-and-noise-ratio (SINR), is affected by several factors, e.g., a path loss and the path loss' variation of a subscriber station within a coverage area of a base station, interference from other subscriber stations both from the same-cell and from other-cell, interference from other base stations, and other factors known to one of ordinary skill in the art. In order to maintain a certain level of service under variable conditions of the communication channel, TDMA and FDMA systems resort to separating users by different frequencies and and/or time-slots and support frequency reuse to mitigate the interference. Frequency reuse divides an available spectrum into many sets of frequencies. A given cell uses frequencies from only one set; the cells immediately adjacent to this cell may not use a frequency from the same set. In a CDMA system, the identical frequency is reused in every cell of the communication system, thereby improving the overall efficiency. The interference is mitigated by other techniques, e.g., orthogonal coding, transmission power control, variable rate data, and other techniques known to one of ordinary skill in the art.

The above-mentioned concepts were utilized in a development of a data traffic only communication system known as the High Data Rate (HDR) communication system. Such a communication system is disclosed in detail in U.S. Pat. No. 6,574,211, entitled "METHOD AND APPARATUS FOR HIGH RATE PACKET DATA TRANSMISSION," issued on Jun. 3, 2003, assigned to the present assignee. The HDR communication system was standardized as a TIA/EIA/IS-856 industry standard hereinafter referred to as the IS-856 standard.

The IS-856 standard defines a set of data rates, ranging from 38.4 kbps to 2.4 Mbps, at which an access point (AP) may send data to a subscriber station (access terminal). Because the access point is analogous to a base station, the terminology with respect to cells and sectors is the same as with respect to voice systems. In accordance with the IS-856 standard, the data to be transmitted over the forward link are partitioned into data packets, with each data packet being transmitted over one or more intervals (time-slots), into which the forward link is divided. At each time-slot, data transmission occurs from an access point to one and only one access terminal, located within the coverage area of the access point, at the maximum data rate that can be supported by the forward link and the communication system. The access terminal is selected in accordance with forward link conditions between the access point and an access terminal. The forward link conditions depend on interference and path loss between an access point and an access terminal, both of which are time-variant. The path loss and the variation of the path loss are exploited by scheduling the access point's transmissions at time intervals, during which the access terminal's forward link conditions to a particular access point satisfy determined criteria that allow for transmissions with less power or higher rate of data than transmissions to the remaining access terminals, thus improving spectral efficiency of forward link transmissions.

In contrast, according to the IS-856 standard, data transmissions on the reverse link occur from multiple access terminals located within a coverage area of an access point. Furthermore, because the access terminals' antenna patterns are omni-directional, any access terminal within the coverage area of the access point may receive these data transmissions. Consequently, the reverse link transmissions are subjected to several sources of interference: code-division multiplexed overhead channels of other access terminals, data transmissions from access terminals located in the coverage area of the access point (same-cell access terminals), and data transmissions from access terminals located in the coverage area of other access points (other-cell access terminals).

With the development of wireless data services, the emphasis has been on increasing data throughput on the forward link, following the model of Internet services; where a server provides high rate data in response to requests from a host. The server-to-host direction is akin to a forward link requiring a high throughput, while the host-to-server requests and/or data transfers are at lower throughput. However, present developments indicate a growth of reverse link data intense applications, e.g., file transfer protocol (FTP), video conferencing, gaming, constant bit rate services, and the like. Such applications require improved efficiency of the reverse link to achieve higher data rates, so that applications demanding high throughput over reverse link. Therefore, there is a need in the art to increase data throughput on the reverse link, ideally to provide symmetric forward and reverse links throughputs. The increased data throughput on the reverse link further creates need in the art for method and apparatus for a power control and a rate of data determination.

The above and further features of the invention are set forth with particularity in the appended claims and together with advantages thereof will become clearer form considerations of the following detailed description of embodiments of the invention given by way of example with reference to the accompanying drawings.

SUMMARY

In one aspect of the invention, the above stated needs are addressed by transmitting from each of a subset of the plural access terminals a request to transmit in an interval; making a decision at the access network to schedule at least one of the subset of the plural access terminals to transmit in the interval in accordance with the request; and transmitting from the at least one access point the decision to the plural access terminals.

In another aspect of the invention, the above stated needs are addressed by receiving at the access network at least one request to transmit in an interval; making a decision at the access network to schedule at least one transmission in the interval in accordance with the at least one request; and transmitting from the at least one access point the decision.

In another aspect of the invention, the above stated needs are addressed by transmitting from each of a subset of the plural access terminals a request to transmit in an interval; and receiving at the at least one of the plural access terminals a scheduling decision.

DETAILED DESCRIPTION

Figure 1:
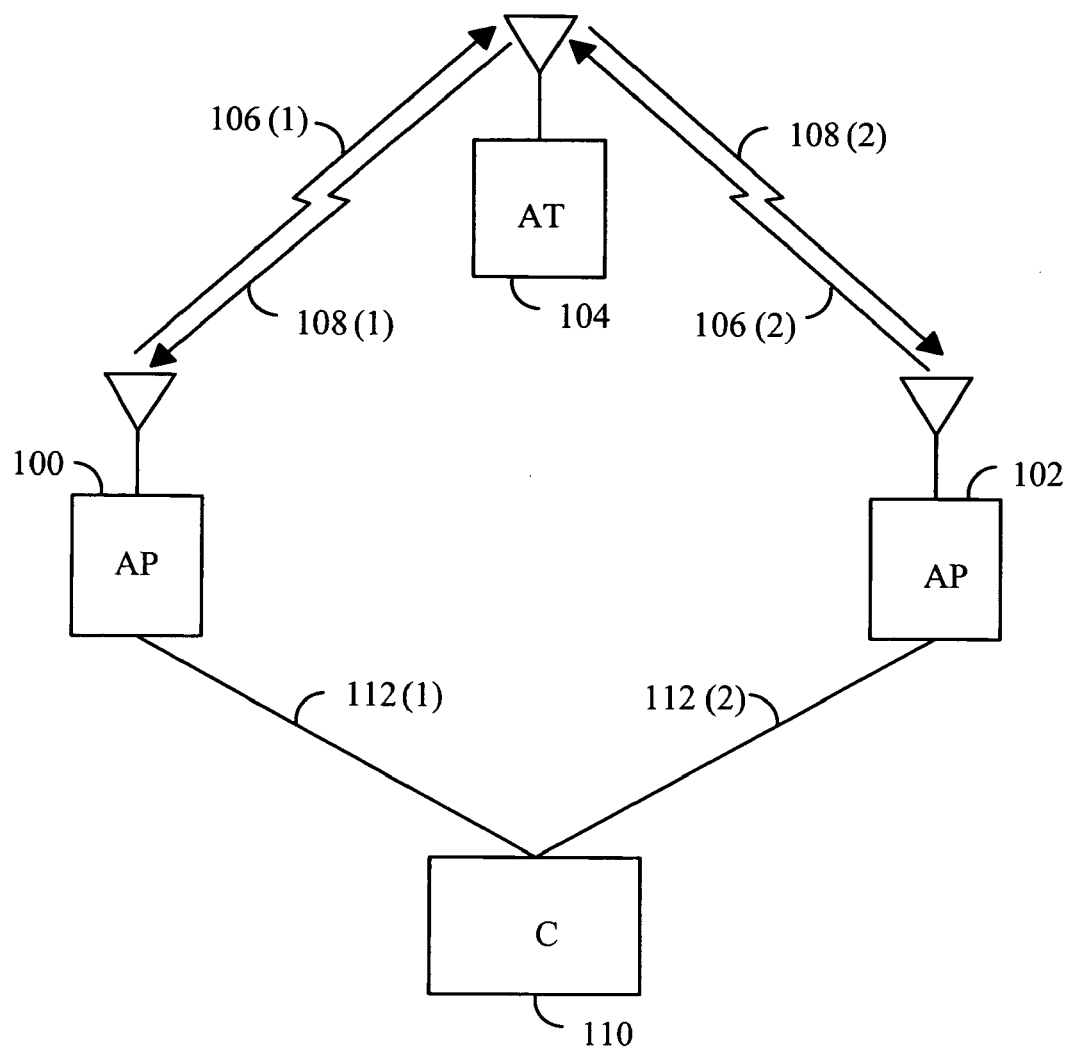
FIG. 1 illustrates conceptual block diagram of a communication system capable of providing data transmission over reverse or forward links.

FIG. 1 illustrates a conceptual diagram of a communication system. Such a communication system can be built in accordance with the IS-856 standard. An access point 100 transmits data to an access terminal 104 over a forward link 106(1), and receives data from the access terminal 104 over a reverse link 108(1). Similarly, an access point 102 transmits data to the access terminal 104 over a forward link 106(2), and receives data from the access terminal 104 over a reverse link 108(2). Data transmission on the forward link occurs from one access point to one access terminal at or near the maximum data rate that can be supported by the forward link and the communication system. Additional channels of the forward link, e.g., control channel, may be transmitted from multiple access points to one access terminal. Reverse link data communication may occur from one access terminal to one or more access points. The access point 100 and the access point 102 are connected to a controller 110 over backhauls 112(1) and 112(2). A "backhaul" is a communication link between a controller and an access point. Although only two access points and one access terminal are shown in FIG. 1, this is for the sake of explanation only, and the communication system can comprise a plurality of access terminals and access points.

After registration, which allows an access terminal to access an access network, the access terminal 104 and one of the access points, e.g., the access point 100, establish a communication link using a predetermined access procedure. In the connected state, resulting from the predetermined access procedure, the access terminal 104 is able to receive data and control messages from the access point 100, and is able to transmit data and control messages to the access point 100. The access terminal 104 continually searches for other access points that could be added to the access terminal's 104 active set. An active set comprises a list of access points capable of communication with the access terminal 104. When such an access point is found, the access terminal 104 calculates a quality metric of the access point's forward link, which may comprise a signal-to-interference-and-noise ratio (SINR). An SINR may be determined in accordance with a pilot signal. The access terminal 104 searches for other access points and determines access points' SINR. Simultaneously, the access terminal 104 calculates a quality metric of a forward link for each access point in the access terminal's 104 active set. If the forward link quality metric from a particular access point is above a predetermined add threshold or below a predetermined drop threshold for a predetermined period of time, the access terminal 104 reports this information to the access point 100. Subsequent messages from the access point 100 may direct the access terminal 104 to add to or to delete the particular access point from the access terminal 104 active set.

The access terminal 104 selects a serving access point from the access terminal's 104 active set based on a set of parameters. A serving access point is an access point that is selected for data communication with a particular access terminal or an access point that is communicating data to the particular access terminal. The set of parameters may comprise any one or more of present and previous SINR measurements, a bit-error-rate, a packet-error-rate, for example, and any other known parameters. Thus, for example, the serving access point may be selected in accordance with the largest SINR measurement. The access terminal 104 then broadcasts a data request message (DRC message) on a data request channel (DRC channel). The DRC message can contain a requested data rate or, alternatively, an indication of a quality of the forward link, e.g., measured SINR, a bit-error-rate, a packet-error-rate and the like. The access terminal 104 may direct the broadcast of the DRC message to a specific access point by the use of a code, which uniquely identifies the specific access point. Typically, the code comprises a Walsh code. The DRC message symbols are exclusively OR'ed (XOR) with the unique Walsh code. This XOR operation is referred to as Walsh covering of a signal. Since each access point in the active set of the access terminal 104 is identified by a unique Walsh code, only the selected access point which performs the identical XOR operation as that performed by the access terminal 104 with the correct Walsh code can correctly decode the DRC message.

The data to be transmitted to the access terminal 104 arrive at the controller 110. Thereafter, the controller 110 may send the data to all access points in the access terminal 104 active set over the backhaul 112. Alternatively, the controller 110 may first determine, which access point was selected by the access terminal 104 as the serving access point, and then send the data to the serving access point. The data are stored in a queue at the access point(s). A paging message is then sent by one or more access points to the access terminal 104 on respective control channels. The access terminal 104 demodulates and decodes the signals on one or more control channels to obtain the paging messages.

At each forward link interval, the access point may schedule data transmissions to any of the access terminals that received the paging message. An exemplary method for scheduling transmission is described in U.S. Pat. No. 6,229, 795, entitled "SYSTEM FOR ALLOCATING RESOURCES IN A COMMUNICATION SYSTEM," assigned to the present assignee. The access point uses the rate control information received in the DRC message from each access terminal to efficiently transmit forward link data at the highest possible rate. Because the rate of data may vary, the communication system operates in a variable rate mode. The access point determines the data rate at which to transmit the data to the access terminal 104 based on the most recent value of the DRC message received from the access terminal 104. Additionally, the access point uniquely identifies a transmission to the access terminal 104 by using a spreading code which is unique to that mobile station. This spreading code is a long pseudo noise (PN) code, for example a spreading code defined by the IS-856 standard.

The access terminal 104, for which the data packet is intended, receives and decodes the data packet. Each data packet is associated with an identifier, e.g. a sequence number, which is used by the access terminal 104 to detect either missed or duplicate transmissions. In such an event, the access terminal 104 communicates the sequence numbers of the missing data packets via the reverse link data channel. The controller 110, which receives the data messages from the access terminal 104 via the access point communicating with the access terminal 104, then indicates to the access point what data units were not received by the access terminal 104. The access point then schedules a re-transmission of such data packets.

When the communication link between the access terminal 104 and the access point 100, operating in the variable rate mode, deteriorates below a predetermined reliability level, the access terminal 104 first attempts to determine whether another access point in the variable rate mode can support an acceptable rate of data. If the access terminal 104 ascertains such an access point (e.g., the access point 102), a re-pointing to the access point 102 to a different communication link occurs. The term re-pointing is a selection of a sector that is a member of an access terminals' active list, wherein the sector is different than a currently selected sector. The data transmissions continue from the access point 102 in the variable rate mode.

The above-mentioned deterioration of the communication link can be caused by, e.g., the access terminal 104 moving from a coverage area of the access point 100 to the coverage area of the access point 102, shadowing, fading, and other well known reasons. Alternatively, when a communication link between the access terminal 104 and another access point (e.g., the access point 102) that may achieve a higher throughput rate than the currently used communication link becomes available, a re-pointing to the access point 102 to a different communication link occurs, and the data transmissions continue from the access point 102 in the variable rate mode. If the access terminal 104 fails to detect an access point that can operate in the variable rate mode and support an acceptable data rate, the access terminal 104 transitions into a fixed rate mode. In such a mode, access terminal 104 transmits at one rate.

The access terminal 104 evaluates the communication links with all candidate access points for both variable rate data and fixed rate data modes, and selects the access point, which yields the highest throughput.

The access terminal 104 will switch from the fixed rate mode back to the variable rate mode if the sector is no longer a member of the access terminal 104 active set.

The above-described fixed rate mode and associated methods for transition to and from the fixed rate data mode are similar to those disclosed in detail in U.S. Pat. No. 6,205,129, entitled "METHOD AND APPARATUS FOR VARIABLE AND FIXED FORWARD LINK RATE CONTROL IN A MOBILE RADIO COMMUNICATION SYSTEM," assigned to the present assignee. Other fixed rate modes and associated methods for transition to and from the fixed mode can also be contemplated and are within the scope of the present invention.

Forward Link Structure

Figure 2:
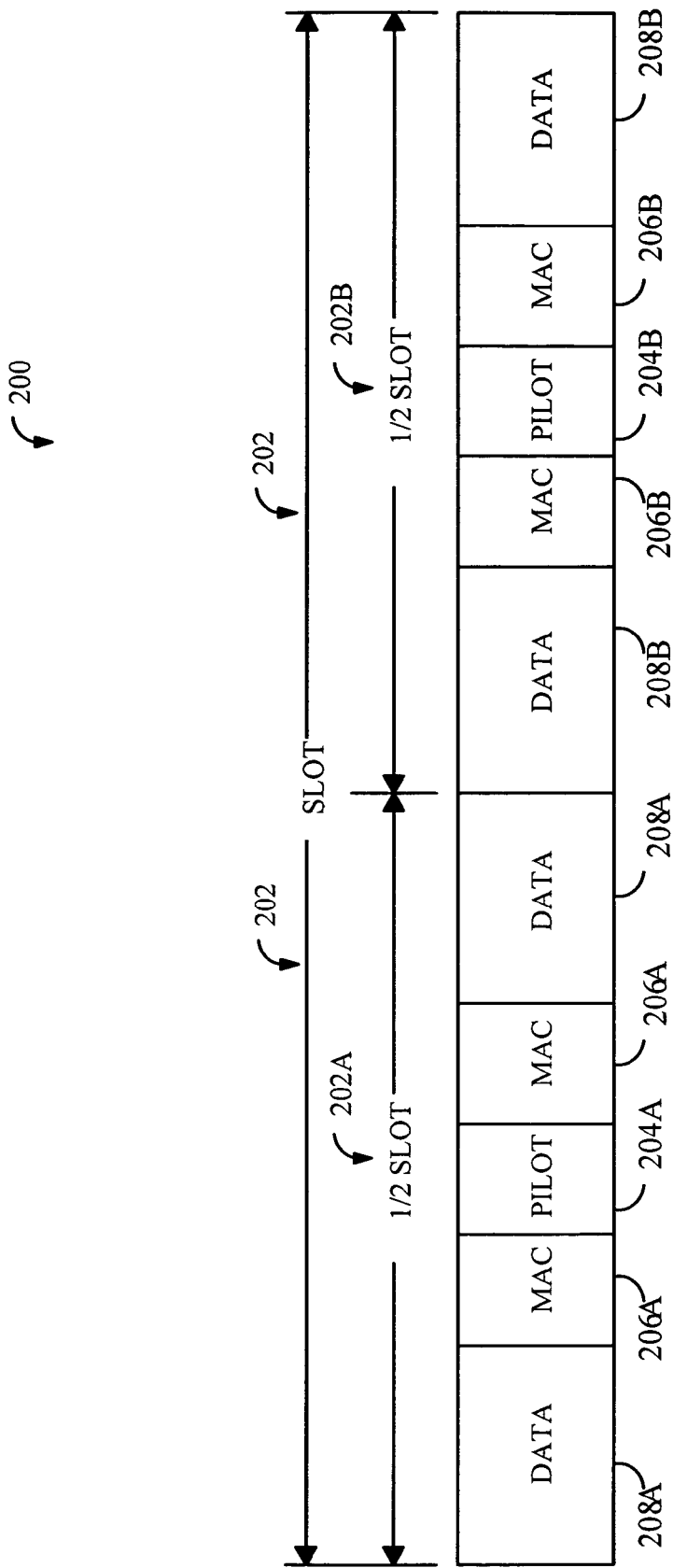
FIG. 2 illustrates a forward link waveform.

FIG. 2 illustrates a forward link structure 200. It will be appreciated that the below described time durations, chip lengths, value ranges are given in a way of example only, and other time durations, chip lengths, value ranges may be used without departing from the underlying principles of operation of the communication system. The term "chip" is a unit of a Walsh code spreading signal having two possible values.

The forward link 200 is defined in terms of frames. A frame is a structure comprising 16 time-slots 202, each time-slot 202 being 2048 chips long, corresponding to a 1.66 ms time-slot duration, and, consequently, a 26.66 ms frame duration. Each time-slot 202 is divided into two half-time-slots 202A, 202B, with pilot bursts 204A, 204B transmitted within each half-time-slot 202A, 202B. Each pilot burst 204A, 204B is 96 chips long, centered about a mid-point of its associated half-time-slot 202A, 202B. The pilot bursts 204A, 204B comprise a pilot channel signal covered by a Walsh cover with index 0. A forward medium access control channel (MAC) 206 forms two bursts, which are transmitted immediately before and immediately after the pilot burst 204 of each half-time-slot 202. The MAC is composed of up to 64 code channels, which are orthogonally covered by 64-ary Walsh codes. Each code channel is identified by a MAC index, which has a value between 1 and 64, and identifies a unique 64-ary covering Walsh code. A reverse power control channel (RPC) is used to regulate the power of the reverse link signals for each subscriber station. The RPC is assigned to one of the available MACs with MAC index between 5 and 63. The forward link traffic channel or the control channel payload is sent in the remaining portions 208A of the first half-time-slot 202A and the remaining portions 208B of the second half-time-slot 202B. The traffic channel carries user data, while the control channel carries control messages, and may also carry user data. The control channel is transmitted with a cycle defined as a 256 slot period at a data rate of 76.8 kbps or 38.4 kbps. The term user data, also referred to as traffic, is information other than overhead data. The term overhead data is information enabling operation of entities in a communication system, e.g., call maintenance signaling, diagnostic and reporting information, and the like.

Packed Grant Channel and Automatic
Re-Transmission Request

To support the reverse link transmission, an additional packet grant (PG) channel is needed in the forward link. The modulation of the above-mentioned RPC channel is changed from binary phase-shift keying (BPSK) to a quadrature-phase shift keying (QPSK), to support PG channel commands.

Figure 3:
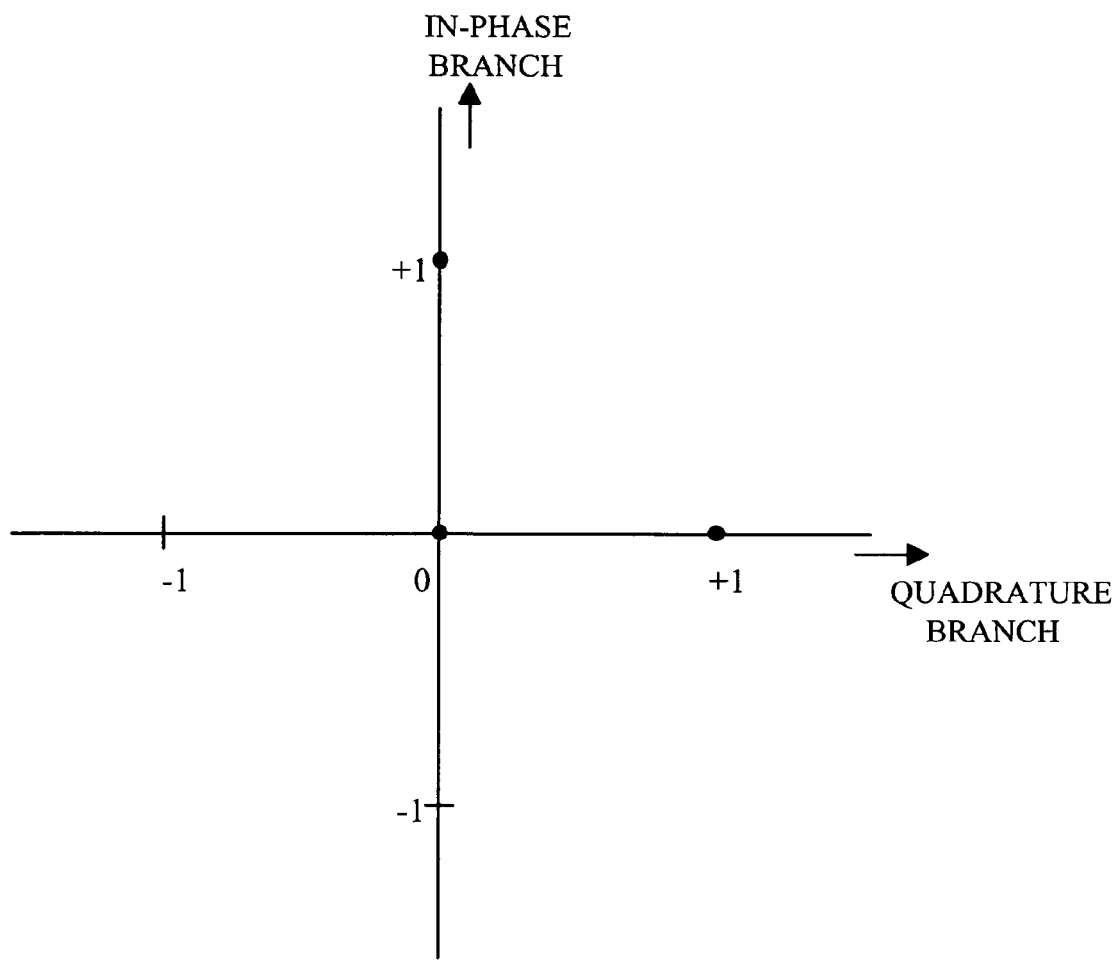
FIG. 3 illustrates a method of communicating power control commands and packet grant commands over a reverse power control channel.

The power control commands are modulated on the in-phase branch of the RPC channel assigned to an access terminal. The power control command information is binary, wherein a first value of a power control bit ("up") commands the access terminal to increase the access terminal's transmit power and a second value of a power control bit ("down") commands the access terminal to decrease the access terminal's transmit power. As illustrated in FIG. 3, the "up" command is represented as +1; the "down" command is represented as −1. However, other values may be used.

The PG channel is communicated over a quadrature branch of the RPC channel assigned to the access terminal. Information transmitted on the PG channel is ternary. As illustrated in FIG. 3, the first value is represented as +1, the second value is represented as 0, and the third value is represented as −1. The information has the following meaning to both the access point and the access terminal:

+1 means that permission to transmit a new packet has been granted;

0 means that permission to transmit a new packet has not been granted; and

−1 means that permission to transmit an old packet (re-transmission) has been granted.

The above described signaling, in which transmission of information value 0 requires no signal energy, allows the access point to assign energy to the PG channel only when transmitting an indication to transmit a packet. Because only one or a small number of access terminals are granted permission to transmit on the reverse link in a time interval, the PG channel requires very little power in order to provide reverse link transmission information. Consequently, impact on the RPC power allocation method is minimized. The RPC power allocation method is disclosed in U.S. Pat. No. 6,678, 257, entitled "METHODS AND APPARATUS FOR ALLOCATION OF POWER TO BASE STATION CHANNELS," issued on Jan. 13, 2004, assigned to the present assignee. Furthermore, the access terminal is required to perform a ternary decision on the quadrature stream only when the access terminal is expecting a response following a data transmit request, or when the access terminal has a pending data transmission. However, it will be appreciated that the choice of the ternary values is a design choice, and values, other than the ones described may be used instead.

The access terminal receives and demodulates the RPC/PG channel from all access points in the access terminal's active set. Consequently, the access terminal receives the PG channel information conveyed over the quadrature branch of the RPC/PG channel for every access point in the access terminal's active set. The access terminal may filter the energy of the received PG channel information over one update interval, and compare the filtered energy against a set of thresholds. By appropriate choice of the thresholds, the access terminals that have not been granted permission for transmission, decode the zero energy assigned to the PG channel as 0 with high probability.

The information conveyed over the PG channel is further used as a means for Automatic Re-transmission reQuest. As discussed below, a reverse link transmission from an access terminal may be received on several access points. Consequently, the information transmitted in response to the reverse link transmission over the PG channel is interpreted differently when transmitted by a serving or non-serving access point.

The serving access point generates and transmits permission to transmit a new packet as a response to an access terminal's request to transmit a new packet if a previous packet from the access terminal was received correctly. Consequently, such information on the PG channel serves as an acknowledgement (ACK). The serving access point generates and transmits permission to re-transmit the previous packet as a response to the access terminal's request to transmit a new packet if the previous packet from the access terminal was received incorrectly.

The non-serving access point generates and transmits a value indicating a permission to transmit upon correctly receiving a previous packet from the access terminal. Consequently, such information on the PG channel serves as an ACK. The non-serving access point generates and transmits value indicating a permission to re-transmit upon incorrectly receiving previous packet from the access terminal. Consequently, such information on the PG channel serves as a NACK. Therefore, no separate ACK/NACK channel is necessary.

It is possible that an access terminal receives conflicting information on the PG channel, e.g., because some access points failed to correctly receive the access terminal's transmission, because the information on the PG channel was erased or incorrectly received, or for other known reasons. Because, from the access network perspective, it does not matter, which access point received the access terminal's transmission, when the access terminal receives information on the PG channel interpreted as an ACK from any access points, it transmits a new packet at the next transmission grant, although the serving access point may send a permission to re-transmit an old packet.

The above-described forward link 200 is a modification of a forward link of a communication system in accordance with IS-856 standard. The modification is believed to have the smallest impact on the forward link structure, and consequently requires the least changes to the IS-856 standard. However, it will be appreciated that the teaching is applicable to different forward link structures. Thus, for example, the above-described forward link channels may be transmitted not sequentially but simultaneously. Additionally, any forward link, enabling communication of information provided in the PG channel, e.g., a separate PG and ACK/NACK code channels, may be used instead.

Reverse Link

As discussed above, quality and effectiveness of a data transfer is dependent on conditions of the channel between a source terminal and a destination terminal. Channel conditions depend on interference and path loss, both of which are time-variant. Therefore, the reverse link performance may be improved by methods to mitigate interference. On the reverse link, all access terminals in an access network may simultaneously transmit on the same frequency (one frequency reuse set) or multiple access terminals in the access network may simultaneously transmit on the same frequency (frequency reuse set greater than one). It is noted that the reverse link as described herein may utilize any frequency reuse. Therefore, any access terminal's reverse link transmission is subject to several sources of interference. The most dominant sources of interference are:

transmission of code-division multiplexed overhead channels from other access terminals both from the same-cell and from other-cells;

transmission of user data by access terminals in the same-cell; and transmission of user data by access terminals from other-cells.

Studies of reverse link performance in the code-division multiple access (CDMA) communication systems indicate that eliminating same-cell interference may achieve a significant improvement in the quality and effectiveness of the data transfer. Same-cell interference in the communication system in accordance with the IS-856 standard may be mitigated by limiting the number of access terminals that may simultaneously transmit on the reverse link.

Because two modes of operation, i.e., limiting the number of simultaneously transmitting access terminals and allowing all access terminals to transmit simultaneously exists, the access network needs to indicate to the access terminals, which mode is to be used. The indication is communicated to the access terminals in periodic intervals, i.e., in a pre-determined portion of a forward link channel, e.g., every control channel cycle. Alternatively, the indication is communicated to the access terminals only upon change by a broadcast message in a forward link channel, e.g., a reverse power control channel.

When operating in the limiting mode, the above-described packet grant forward link channel may be utilized to provide permission or denial to transmit to the access terminals requesting permission to transmit.

The same-cell interference may also be mitigated by time-division-multiplexing traffic channel and overhead channels of the reverse link, and by scheduling, which of the access terminals requesting transmission are allowed to transmit in the reverse link time interval, e.g., a frame, or a time slot. The scheduling may take into account a part of the access network, e.g., a multi-sector cell and can be carried out e.g., by an access point controller. Such a scheduling method mitigates only same-cell interference. Consequently, as an alternative, the scheduling may take into account the entire access network, and can be carried out, e.g., by the controller 110.

It will be appreciated that the number of access terminals permitted to transmit in a time interval influences the interference on the reverse link, and, consequently the quality of service (QoS) on the reverse link. Therefore, the number of access terminals permitted to transmit is a design criterion. Consequently, such a number can be adjusted by the scheduling method in accordance with changing conditions and/or requirements on QoS.

Additional improvements may be achieved by mitigating other-cell interference. The other-cell interference during user data transmissions is mitigated by opportunistic transmission, control of maximum transmit power and rate of user data for each access terminal within a multi-sector cell. An "opportunistic transmission" (and multi-user diversity) mean scheduling an access terminal's transmissions in time interval(s) in which a determined opportunity threshold is exceeded. A time interval may be deemed to be opportune if a metric, determined in accordance with an instantaneous quality metric of the reverse link channel in the time interval, an average quality metric of that reverse link channel, and a function enabling differentiation between users (such as an impatience function described below), exceeds an opportunity threshold. The method enables the access terminal to transmit user data at a lower transmit power and/or to complete the transmission of a packet using fewer time intervals. The lower transmit power and/or completion of a packet transmission in fewer time intervals results in reduced interference from the transmitting access terminals in sectors of the multi-sector cell, and, therefore, in lower overall other-cell interference to access terminals in adjacent cells. Alternatively, the better than average channel condition allows the terminal to utilize the available power to transmit at a higher data rate, thus, causing the same interference to other-cells as the access terminal would cause by utilizing the same available power to transmit at a lower data rate.

In addition to mitigating interference on the reverse link channels, the path loss and the variation of the path loss may be exploited by multi-user diversity to increase throughput. "Multi-user diversity" results from the diversity of channel conditions among the access terminals. The diversity in channel conditions among user terminals allows scheduling an access terminal's transmissions at time intervals, during which the access terminal's channel conditions satisfy determined criteria that allow for transmissions with less power or higher rate of data, thus improving spectral efficiency of reverse link transmissions. Such criteria comprises the quality metric of an access terminal's reverse link channel being better in relation to the average quality metric of the access terminal's reverse link channel.

A design of a scheduler may be used to control access terminals QoS. Thus, for example, by biasing the scheduler towards a subset of the access terminals, the subset may be given transmission priority, although the opportunity reported by these terminals may be lower than opportunity reported by terminals not belonging to the subset. It will be appreciated that a similar effect may be achieved by employing an impatience function discussed below. The term subset is a set whose members comprise at least one but up to all members of another set.

Even employing an opportunistic transmission method, the transmitted packet may be received erroneously and/or erased at an access point. The term erasure is failure to determine a content of the message with a required reliability. This erroneous reception stems from the inability of an access terminal to accurately predict the quality metric of the access terminal's reverse link channel due to the other-cell interference influence. The influence of the other-cell interference is difficult to quantify because the transmissions of access terminals from sectors belonging to different multi-sector cells are unsynchronized, short, and uncorrelated.

To mitigate the incorrect channel estimation and provide interference averaging, Automatic Re-transmission reQuest (ARQ) methods are often used. ARQ methods detect missing or erroneously received packet(s) at a physical layer or a link layer and request re-transmission of these packets from the transmitting terminal. Layering is a method for organizing communication protocols in well-defined encapsulated data units between otherwise de-coupled processing entities, i.e., layers. The protocol layers are implemented in both access terminals and access points. In accordance with the Open Systems Interconnection (OSI) model, protocol layer L1 provides for the transmission and reception of radio signals between the base station and remote station, layer L2 provides for the correct transmission and reception of signaling messages, and layer L3 provides for the control messaging for the communication system. Layer L3 originates and terminates signaling messages according to the semantics and timing of the communication protocol between access terminals and access points.

In an IS-856 communication system, the air interface signaling layer L1 is referred to as the Physical Layer, L2 is referred to as the Link Access Control (LAC) Layer or the Medium Access Control (MAC) Layer, and L3 is referred to as the Signaling Layer. Above the Signaling Layer are additional layers, which in accordance with the OSI model are numbered L4-L7 and are referred to as the Transportation, Session, Presentation and Application Layers. A physical layer ARQ is disclosed in U.S. Pat. No. 6,694,469, entitled "Method and Apparatus for Quick Re-transmission of Signals In A Communication System," issued on Feb. 17, 2004, assigned to the present assignee. An example of a link layer ARQ method is the Radio Link Protocol (RLP). RLP is a class of error control protocols known as not-acknowledge (NAK) based ARQ protocols. One such RLP is described in TIA/EIA/IS-707-A.8, entitled "DATA SERVICE OPTIONS FOR SPREAD SPECTRUM SYSTEMS: RADIO LINK PROTOCOL TYPE 2," hereinafter referred to as RLP2. The transmissions of both the original and a re-transmitted packets may be opportunistic.

Reverse Link Channels

Figure 4A:
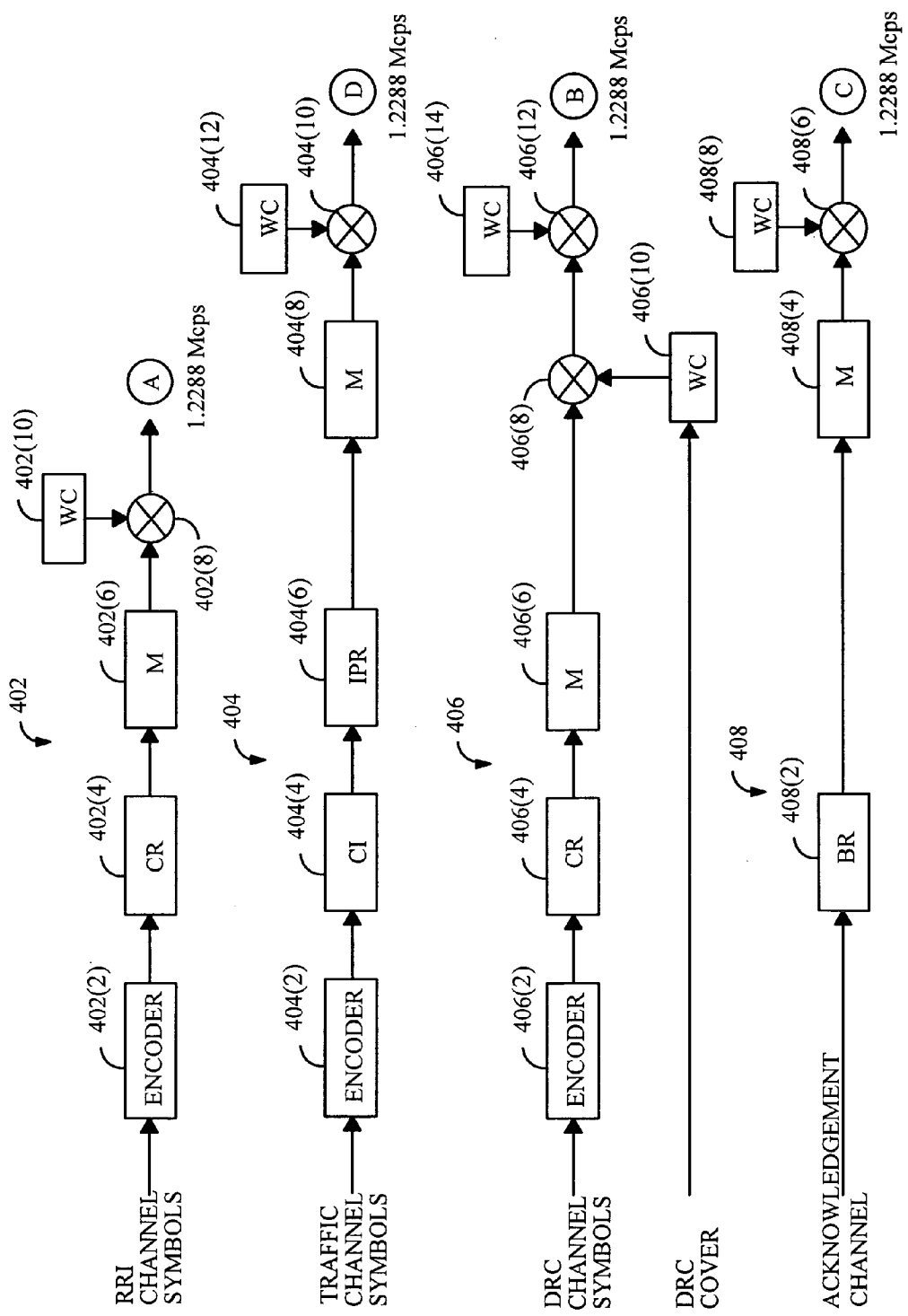
FIGS. 4A-4C illustrate a reverse link channels' architecture.
Figure 4B:
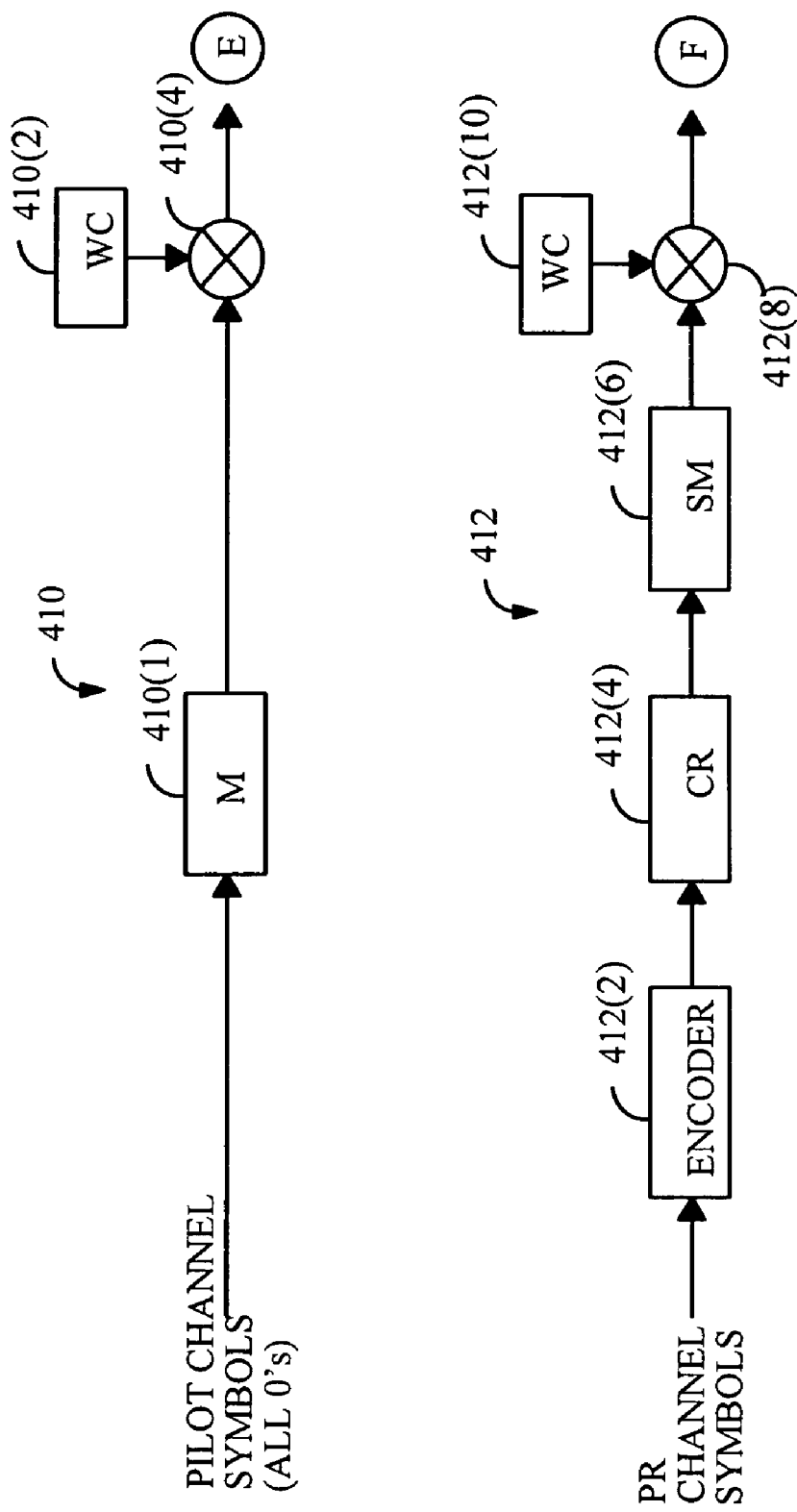
Figure 4C:
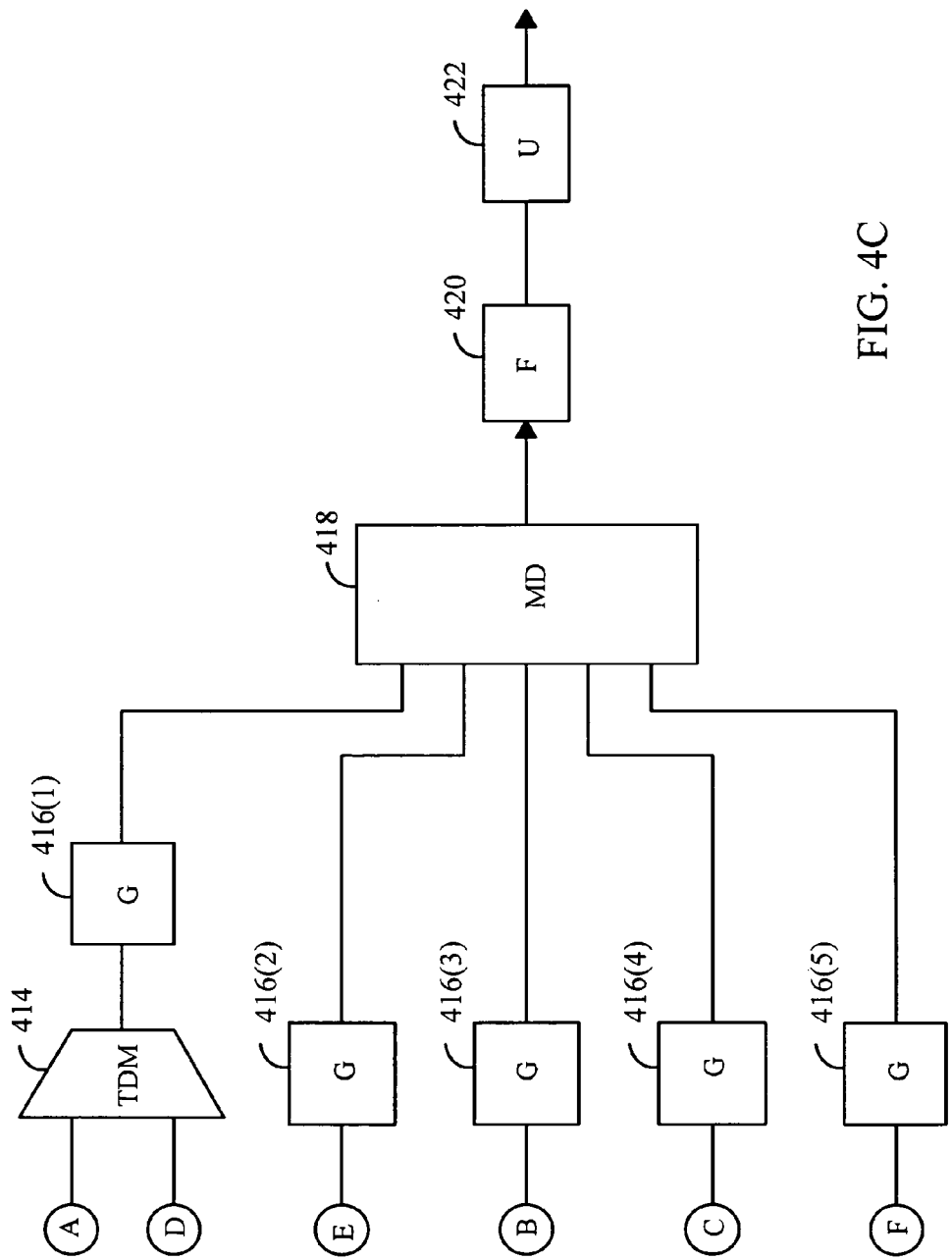

FIGS. 4A-4C illustrate a reverse link. As illustrated in FIGS. 4A-4B, the reverse link comprises a Pilot Channel (PC) 410, a Data Request channel (DRC) 406, an Acknowledgement channel (ACK) 408, a Packet Request channel (PR) 412, a Reverse Link Traffic channel 404, a Reverse Rate Indication channel (RRI) 402.

As described below, an exemplary reverse link waveform generated by the channel structure described in FIGS. 4A-C and accompanying text, is defined in terms of frames, a frame being a structure comprising 16 time-slots. Therefore, for tutorial purposes a time-slot is adopted as a measure of a time interval. However, it will be appreciated that the concept of time interval may be extended to any other unit, i.e., multiple time-slot, a frame, and the like.

Pilot Channel

The Pilot Channel 410 is used for coherent demodulation and estimation of a reverse link channel quality. The Pilot Channel 410 comprises unmodulated symbols with a binary value of '0'. The unmodulated symbols are provided to a block 410(1), which maps '0' binary valued symbols onto symbols with a value +1, and '1' binary valued symbols onto symbols with a value −1. The mapped symbols are covered with a Walsh code generated by a block 410(2), in block 410(4).

Data Request Channel

The Data Request Channel 406 is used by the access terminal to indicate to the access network the selected serving sector and the requested data rate on the Forward Traffic Channel. The requested Forward Traffic Channel data rate comprises a four-bit DRC value. The DRC values are provided to a block 406(2), which encodes the four-bit DRC value to yield bi-orthogonal code words. The DRC codeword is provided to a block 406(4), which repeats each of the codeword twice. The repeated codeword is provided to a block 406(6), which maps '0' binary valued symbols onto symbols with a value +1, and '1' binary valued symbols onto symbols with a value −1. The mapped symbols are provided to a block 406(8), which covers each symbol with a Walsh code $W_i^8$ generated by a block 406(10), in accordance with a DRCCover identified by index i. Each resulting Walsh chip then provided to block 406(12), where the Walsh chips are covered by Walsh code $W_8^{16}$, generated by a block 406(14).

Reverse Rate Indication Channel

The RRI channel 402 provides an indication of a reverse link packet type. The packet type indication provides the access point with information that assists the access point in determining if soft-decisions from a currently received packet can be soft-combined with the soft-decisions from previously received packet(s). As discussed above, soft-combining takes advantage of soft-decision values, obtained from previously received packets. An access point determines bit values (hard-decision) of a packet by comparing energies at bit positions of decoded packet (soft-decision values) against a threshold. If an energy corresponding to a bit is greater than the threshold, the bit is assigned a first value, e.g., '1', otherwise the bit is assigned a second value, e.g., '0'. The access point then ascertains, whether the packet decoded correctly, e.g., by performing a CRC check, or by any other equivalent or suitable method. If such test fails, the packet is considered erased. However, the access point saves the soft-decision values (if the number of re-transmission attempts for the packet is less than a maximum number of allowed attempts), and when the access point acquires soft-decision values of the next packet, it can combine the soft-decision values of the already received packets before comparing them against the threshold.

Methods of combining are well known and, therefore, need not be described here. One suitable method is described in detail in a U.S. Pat. No. 6,101,168, entitled "Method and Apparatus for Time Efficient Re-transmission Using Symbol Accumulation," assigned to the present assignee.

However, in order to meaningfully soft-combine packets, the access terminal must know that the packets comprise information that may be combined. The RRI value may comprise, for example, 3 bits. The most significant bit (MSB) of the RRI indicates whether the packet is an original transmission or a re-transmission. The remaining two bits indicate one of four packet classes as determined in accordance with the packet's code rate, number of bits comprising the packet, and number of re-transmission attempts. To enable soft-combining, the packet's code rate and number of bits comprising the packet remain the same in the transmission and re-transmission attempts.

The RRI value is provided to a block 402(2), which bi-orthogonally encodes the 3-bits to provide a codeword. An example of bi-orthogonal encoding is illustrated in Table 1.

TABLE 1

| RRI bits value | Codeword |
| --- | --- |
| 000 | 00000000 |
| 001 | 11111111 |

TABLE 1-continued

| RRI bits value | Codeword |
| --- | --- |
| 010 | 01010101 |
| 011 | 10101010 |
| 100 | 00110011 |
| 101 | 11001100 |
| 110 | 01100110 |
| 111 | 10011001 |

The codeword is provided to a block 402(4), which repeats each of the codeword. The repeated codeword is provided to a block 402(6), which maps '0' binary valued symbols onto symbols with a value +1, and '1' binary valued symbols onto symbols with a value −1. The mapped symbols are further provided to a block 402(8), which covers each symbol with a Walsh code generated by block 402(10), and the resulting chips are provided for further processing.

To support more than four packet classes, the RRI value may comprise, for example, four bits. The most significant bit (MSB) of the RRI indicates whether the packet is an original transmission or a re-transmission. The remaining three bits indicate one of the packet classes. Again, the number of bits comprising the packet remains the same in the transmission and re-transmission attempts.

The RRI value is provided to a block 402(2), which encodes the 4 bits into a 15 bit simplex codeword. An example of the simplex encoding is illustrated in Table 2.

TABLE 2

| Data Rate (kbps) | RRI Symbol | RRI code word |
| --- | --- | --- |
| 76.8 (new) | 0 0 0 0 | 0 0 0 0 0 0 0 0 0 0 0 0 0 0 0 |
| 153.6 (new) | 0 0 0 1 | 1 0 1 0 1 0 1 0 1 0 1 0 1 0 1 |
| 230.4 (new) | 0 0 1 0 | 0 1 1 0 0 1 1 0 0 1 1 0 0 1 1 |
| 307.2 (new) | 0 0 1 1 | 1 1 0 0 1 1 0 0 1 1 0 0 1 1 0 |
| 460.8 (new) | 0 1 0 0 | 0 0 0 1 1 1 1 0 0 0 0 1 1 1 1 |
| 614.4 (new) | 0 1 0 1 | 1 0 1 1 0 1 0 0 1 0 1 1 0 1 0 |
| 921.6 (new) | 0 1 1 0 | 0 1 1 1 1 0 0 0 0 1 1 1 1 0 0 |
| 1,228.8 (new) | 0 1 1 1 | 1 1 0 1 0 0 1 0 1 1 0 1 0 0 1 |
| 76.8 (re) | 1 0 0 0 | 0 0 0 0 0 0 0 1 1 1 1 1 1 1 1 |
| 153.6 (re) | 1 0 0 1 | 1 0 1 0 1 0 1 1 0 1 0 1 0 1 0 |
| 230.4 (re) | 1 0 1 0 | 0 1 1 0 0 1 1 1 1 0 0 1 1 0 0 |
| 307.2 (re) | 1 0 1 1 | 1 1 0 0 1 1 0 1 0 0 1 1 0 0 1 |
| 460.8 (re) | 1 1 0 0 | 0 0 0 1 1 1 1 1 1 1 1 0 0 0 0 |
| 614.4 (re) | 1 1 0 1 | 1 0 1 1 0 1 0 1 0 0 1 0 0 1 0 1 |
| 921.6 (re) | 1 1 1 0 | 0 1 1 1 1 0 0 1 1 0 0 0 0 1 1 |
| 1,228.8 (re) | 1 1 1 1 | 1 1 0 1 0 0 1 1 0 0 1 0 1 1 0 |

Alternatively, the RRI symbols may be used to indicate a range of rates. For example, when the RRI symbols comprise four bits, each of the eight combinations (e.g., 0000, 0001, 0010, 0011, 0100, 0101, 0110, 0111) may indicate a pair of rates of data. Again, the most significant bit (MSB) of the RRI indicates that the packet is an original transmission.

Once the RRI symbols are decoded, the decoder performs blind rate of data determination in accordance with two hypothesis, one hypothesis in accordance to the first rates of data of the pair of rate of data determined in accordance with the RRI symbols, and second hypothesis in accordance to the second rate of data of the pair of rates of data determined in accordance with the RRI symbols. Similarly, the eight combinations (e.g., 1000, 1001, 1010, 1011, 1100, 1101, 1110, 1111) indicate a pair of rates of data of a re-transmitted packet.

Alternatively, two parallel decoders may be used, one decoder decoding the data in accordance with one rate of data, and the second decoder decoding the data in accordance with the second rate of data.

The concept of indirect rate of data indication may be extended to any number of the rates of data to be indicated by a bit combination, the only limitation being the decoder(s) ability to decode the number of the rates of data before the next data to be decoded is received. Consequently, if the decoder can decode all the rates of data, the RRI symbol may comprise one bit, indicating whether the packet is new transmission or a re-transmission.

Further processing of the codewords proceeds as described above.

Packet Ready Channel

Each access terminal desiring to transmit user data indicates to the user terminal's serving sector that user data are available for transmission in a future time-slot and/or that the future time-slot transmission is opportune. A time-slot is deemed to be opportune if an instantaneous quality metric of the reverse link channel time-slot exceeds the average quality metric of that reverse link channel modified by an opportunity level determined in accordance with additional factors, depending on a design of the communication system, exceeds a threshold.

The quality metric of the reverse link is determined in accordance with a reverse pilot channel, e.g., in accordance with an equation (1):

$$\frac{Filt\_TX\_Pilot(n)}{TX\_Pilot(n)} \quad (1)$$

where Tx_Pilot(n) is an energy of a pilot signal during an n-th time-slot; and

Filt_Tx_Pilot(n) is an energy of a pilot signal filtered over past k slots. The filter time-constant, expressed in slots, is determined to provide adequate averaging of the reverse link channel.

Consequently, Equation (1) indicates how much better or worse the instantaneous reverse link is with respect to the average reverse link. The access terminal performs the Tx_Pilot(n) and Filt_Tx_Pilot(n) measurements, and the quality metrics calculation in accordance with Equation (1) at every time-slot. The calculated quality metric is then used to estimate quality metrics for a determined number of time-slots in the future. The determined number of time-slots is two. A method for such quality estimation is described in detail in U.S. Pat. No. 6,807,426, entitled "Method and Apparatus for Scheduling Transmissions Control in a Communication System," issued on Oct. 19, 2004, assigned to the present assignee.

The above-described method of estimation reverse link quality metric is given by way of example only. Thus, other methods, for example a method utilizing a SINR predictor disclosed in detail in U.S. Pat. No. 6,426,971, entitled "System and Method For Accurately Predicting Signal to Interference and Noise Ratio to Improve Communications System Performance," issued on Jul. 30, 2002, assigned to the present assignee, may be used.

The factors determining the opportunity level comprise, e.g., a maximum acceptable transmission delay t (from arrival of a packet at the access terminal to the packet transmission), a number of packets in the queue at the access terminal I (transmit queue length), and an average throughput over the reverse link th. The above-mentioned factors define an "impatience" function I(t,l,th). The impatience function I(t,l,th) is determined in accordance with the desired influence of the input parameters. For example, immediately following a first packet arrival for transmission to the access terminal's queue, the impatience function has a low value, but the value increases if the number of packets in the access terminal's queue exceeds a threshold. The impatience function reaches a maximum value when the maximum acceptable transmission delay is reached. Queue length parameter and transmit throughput parameter affect the impatience function similarly.

Use of the above-mentioned three parameters as inputs to the impatience function is given for the purposes of explanation only; any number or even different parameters may be used in accordance with design considerations of a communication system. Additionally, the impatience function may be different for different users, thus providing user differentiation. Furthermore, functions other than the impatience function may be used to differentiate among users. Thus for example, each user may be assigned an attribute in accordance with the user's QoS. The attribute itself may serve in lieu of the impatience function. Alternatively, the attribute may be used to modify the input parameters of the impatience function.

The impatience function I(t,l,th) may be used to modify the quality metric in accordance with equation (2):

$$\frac{Filt\_TX\_Pilot(n)}{TX\_Pilot(n)} \cdot I(t, l, th) \quad (2)$$

The relationship between the values calculated from Equation (2) and a threshold $T_f$ can be used to define opportunity levels. A set of suitable opportunity levels is given in Table 3 as a way of example. It will be appreciated that different number and different definitions of opportunity levels may be used instead.

TABLE 3

| Opportunity Level | Definition |
| --- | --- |
| 0 | No Data to Transmit |
| 1 | Data available for transmission |
| 2 | Data available for transmission, channel condition "GOOD" OR Impatience to transmit "HIGH" |
| 3 | Data available for transmission, channel condition "VERY GOOD" OR Impatience to transmit "VERY HIGH" |

The appropriate opportunity level is encoded and transmitted over the PR channel. The PR channel is transmitted if an opportunity level other than 0, i.e., "no data to transmit" is to be indicated. The above-described four opportunity levels may be represented as two information bits. The PR channel needs to be received at an access point with a high reliability because any error during the PR channel reception may result in possible scheduling of an access terminal that has not requested user data transmission or reported low opportunity level. Alternatively, such an error can result in failure to schedule an access terminal that reported high opportunity level. Consequently, the two information bits need to be delivered with sufficient reliability.

As described above, the opportune transmit time-slot is implied because both the access point and the access terminal have knowledge of a pre-determined number of time-slots in the future, for which the opportune level has been estimated. Because the timing of the access points and access terminals is synchronized, the access point is able to determine which time-slot is the opportune transmit time-slot for which the transmit terminal reported the opportunity level. However, it will be appreciated that other arrangements may be employed, in which the opportune transmit time-slot is variable, and is explicitly communicated to the access point.

The PR channel 412 value in accordance with the above-described concepts is expressed as a 2-bit value. The PR value is provided to a block 412(2), which encodes the 2-bits to provide a codeword. The codeword is provided to a block 412(4), which repeats each of the codeword. The repeated codeword is provided to a block 412(6), which maps '0' binary valued symbols onto symbols with a value +1, and '1' binary valued symbols onto symbols with a value −1. The mapped symbols are then provided to a block 412(8), which covers each symbol with a Walsh code generated by block 412(10).

ACK Channel

The ACK channel 408 is used by the access terminal to inform the access network whether a packet transmitted on the Forward Traffic Channel has been received successfully or not. The access terminal transmits an ACK channel bit in response to every Forward Traffic Channel slot that is associated with a detected preamble directed to the access terminal. The ACK channel bit may be set to '0' (ACK) if a Forward Traffic Channel packet has been successfully received; otherwise, the ACK channel bit may be set to '1' (NAK). A Forward Traffic Channel packet is considered successfully received if a CRC checks. The ACK channel bit is repeated in a block 408(2), and provided to a block 408(4). Block 408(4) maps '0' binary valued symbols onto symbols with a value +1, and '1' binary valued symbols onto symbols with a value −1. The mapped symbols are then provided to a block 408(6), which covers each symbol with a Walsh code generated by block 408(8).

When an access terminal is in a soft handoff, the packet may be decoded only by the serving sector.

Traffic Channel

Consistent with the above-formulated reverse link requirement, the Traffic Channel 404 transmits packets at the data rates, ranging from 153.6 kbps to 2.4 Mbps. The packets are encoded in block 404(2) with coding rates, depending on the data rate. The block 404(2) comprises turbo-encoder with coding rates ⅓ or ⅕. The sequence of binary symbols at the output of the block 404(2) is interleaved by a block 404(4). The block 404(4) may comprise a bit-reversal channel interleaver. Depending on the data rate and encoder code rate, the sequence of interleaved code symbols is repeated in block 404(6) as many times as necessary to achieve a fixed modulation symbol rate, and provided to a block 404(8). Block 404(8) maps '0' binary valued symbols onto symbols with a value +1, and '1' binary valued symbols onto symbols with a value −1. The mapped symbols are then provided to a block 404(10), which covers each symbol with a Walsh code generated by block 404(12).

Reverse Link Architecture

FIG. 4C further illustrates a reverse link channels' architecture. Traffic Channel 404, and the RRI channel 402 are time division multiplexed in block 414, and provided to gain adjustment block 416(1). After the gain adjustment, the time division multiplexed signal is provided to a modulator 418.

The Pilot Channel 410, the Data Request channel (DRC) 406, the Acknowledgement channel (ACK) 408, the Packet Request channel (PR) 412, are provided to the respective gain adjustment blocks 416(2)-416(5). After the gain adjustment, the respective channels are provided to the modulator 418.

The modulator 418 combines the incoming channel signals, and modulates the combined channel signals in accordance with an appropriate modulation method, e.g., a binary phase-shift keying (BPSK), a quadrature phase-shift keying (QPSK), quadrature amplitude modulation (QAM), 8-phase-shift keying (8-PSK), and other modulation methods known to one of ordinary skill in the art. The appropriate modulation method may change in accordance with a rate of data to be transmitted, channel condition, and/or other design parameter of the communication system. The combining of the incoming channel signals will change accordingly. For example, when a selected modulation method is QPSK, the incoming channel signals will be combined onto an In-phase and Quadrature signals, and these signals will be quadrature spread. The selection of channel signals are combined on the In-phase and Quadrature signals in accordance with design parameter of the communication system, for example distributing the channels so that the data load between the In-phase and Quadrature signals is balanced.

The modulated signal is the filtered in block 420, upconverted to a carrier frequency in block 422, and provided for transmission.

Reverse Link Waveform

Figure 5A:
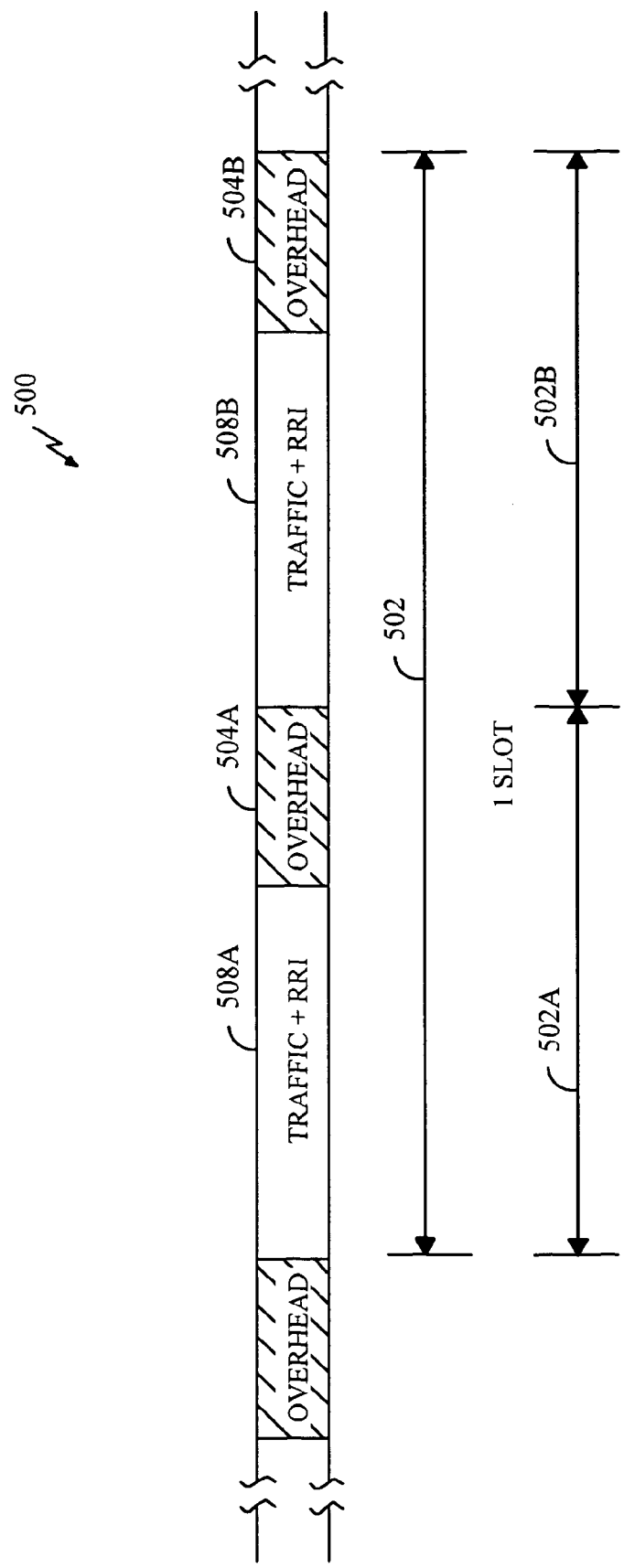
FIGS. 5A-5C illustrate a reverse link waveform of the present invention.

A reverse link 500 generated by the channel structure described in FIGS. 4A-C and accompanying text above is illustrated in FIG. 5A. The reverse link 500 is defined in terms of frames. A frame is a structure comprising 16 time-slots 502, each time-slot 502 being 2048 chips long, corresponding to a 1.66 ms time-slot duration, and, consequently, a 26.66 ms frame duration. Each time-slot 502 is divided into two half-time-slots 502A, 502B, with overhead channel bursts 504A, 504B transmitted within each half-time-slot 502A, 502B. Each overhead channel burst 504A, 504B is 256 chips long, and is transmitted at the end of its associated half-time-slot 502A, 502B. The overhead channel bursts 504A, 504B comprise code-division multiplexed channels. These channels comprise a pilot channel signal covered by a first Walsh code, a data request channel (DRC channel) covered by a second Walsh code, an access channel (ACK channel) covered by a third Walsh code, and a packet request channel (PR channel) covered by a fourth Walsh code.

The reverse link traffic channel payload and reverse rate indication (RRI) channel are sent in the remaining portions 508A of the first half-time-slot 502A and the remaining portions 508B of the second half-time-slot 502B. The division of the time-slot 502 between the overhead channel bursts 504A, 504B and the reverse link traffic channel payload and RRI channel 508A, 508B is determined in accordance with a rise over thermal during the overhead channel bursts 504A, 504B, data throughput, link budget, and other suitable criteria.

Illustrated in FIG. 5A, the time division multiplexed RRI channel and the traffic channel payload are transmitted at the same power level. The power distribution between the RRI channel and the traffic channel is controlled by the number of chips allocated to the RRI channel. The number of chips is allocated to the RRI channel as a function of the transmitted data rate, will be explained below.

It will be appreciated that other methods of combining the reverse link channels, and, consequently resulting reverse link waveforms are possible in accordance with design criteria of the communication system. Thus, the above-described method separates one of the overhead channels, the RRI channel, which needs to be decoded with a high degree of reliability, from the remaining overhead channels. Thus, the remaining overhead channels do not present interference to the RRI channel.

In order to further improve the reliability of the RRI channel decoding, the number of chips allocated to the RRI channel is kept constant. This in turn requires different power to be transmitted in the RRI channel portion of the traffic/RRI channel time-slots 508A, 508B at a different power level than in the traffic channel portion. Such a consideration may be justified by improved decoding performance, resulting from the decoder taking advantage of knowledge that the number of RRI channel chips is fixed, and knowledge of power at which the RRI channel was transmitted.

Figure 5B:
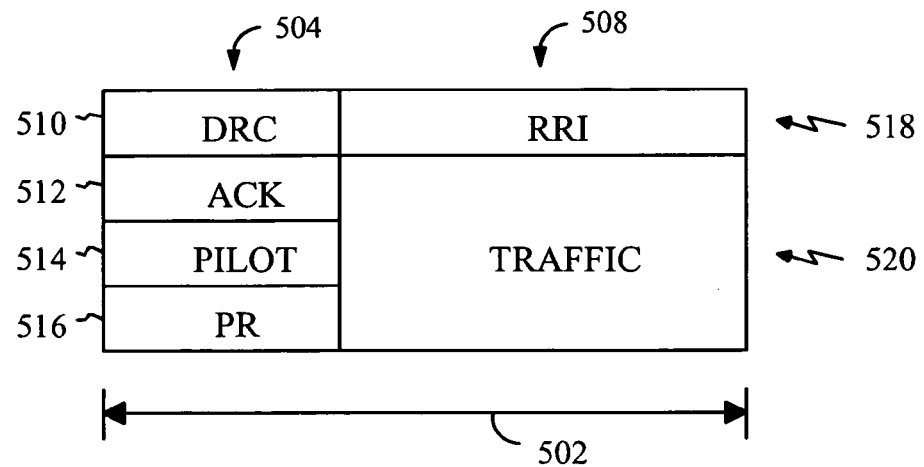

The RRI channel and the Traffic channel are transmitted concurrently, being separated by different codes, e.g., by being covered by different Walsh codes, as illustrated in FIG. 5B. Accordingly, each half-time-slot 502 comprises an overhead channel portion 504, and an RRI and traffic channel portion 508. The overhead channel portion 504 comprises the DRC 510, the ACK 512, the PC 514, and the PR 516. The overhead channels are distinguished by different codes, e.g., by being covered by different Walsh codes. The RRI 518 is covered by different Walsh code than the traffic channel payload 520. The power, allocated between the separate RRI channel and the Traffic channel is determined in accordance with the data rate being transmitted.

Figure 5C:
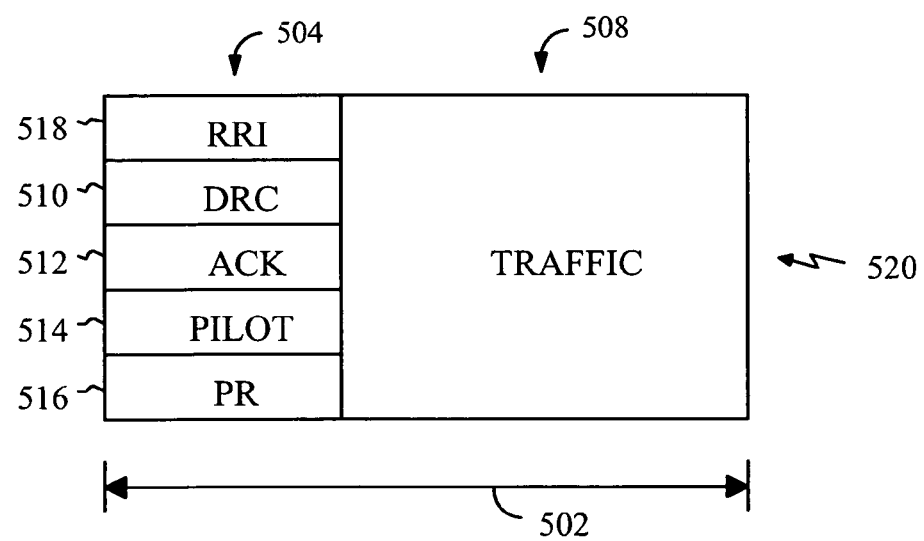

The overhead channels and the Traffic channel are transmitted using time division mode, as illustrated in FIG. 5C. Accordingly, each half-time-slot 502 comprises an overhead channel portion 504, and a traffic channel portion 508. The overhead channel portion 504 comprises the DRC 510, the ACK 512, the PC 514, the PR 516, and the RRI 518. The overhead channels are distinguished by different codes, e.g., by being covered by different Walsh codes. An advantage of the above-described is simplicity.

It will be appreciated that the above-described teaching is applicable to different waveforms. Thus, for example, the waveform does not need to contain pilot signal bursts, and the pilot signal can be transmitted on a separate channel, which can be continuous or bursty.

Reverse Link Data Transmission

As discussed, the reverse link transmission occurs from at least one access terminal in an interval. For tutorial purposes only, the reverse link data transmission as described below uses an interval equal to a time-slot. The reverse link transmission is scheduled by an entity in an access network in response to the access terminals' request to convey user data. The access terminal is scheduled in accordance with the quality metric of the access terminal's channel in the interval on the reverse link, the access terminal's average reverse link quality metric, and an impatience function.

Figure 6:
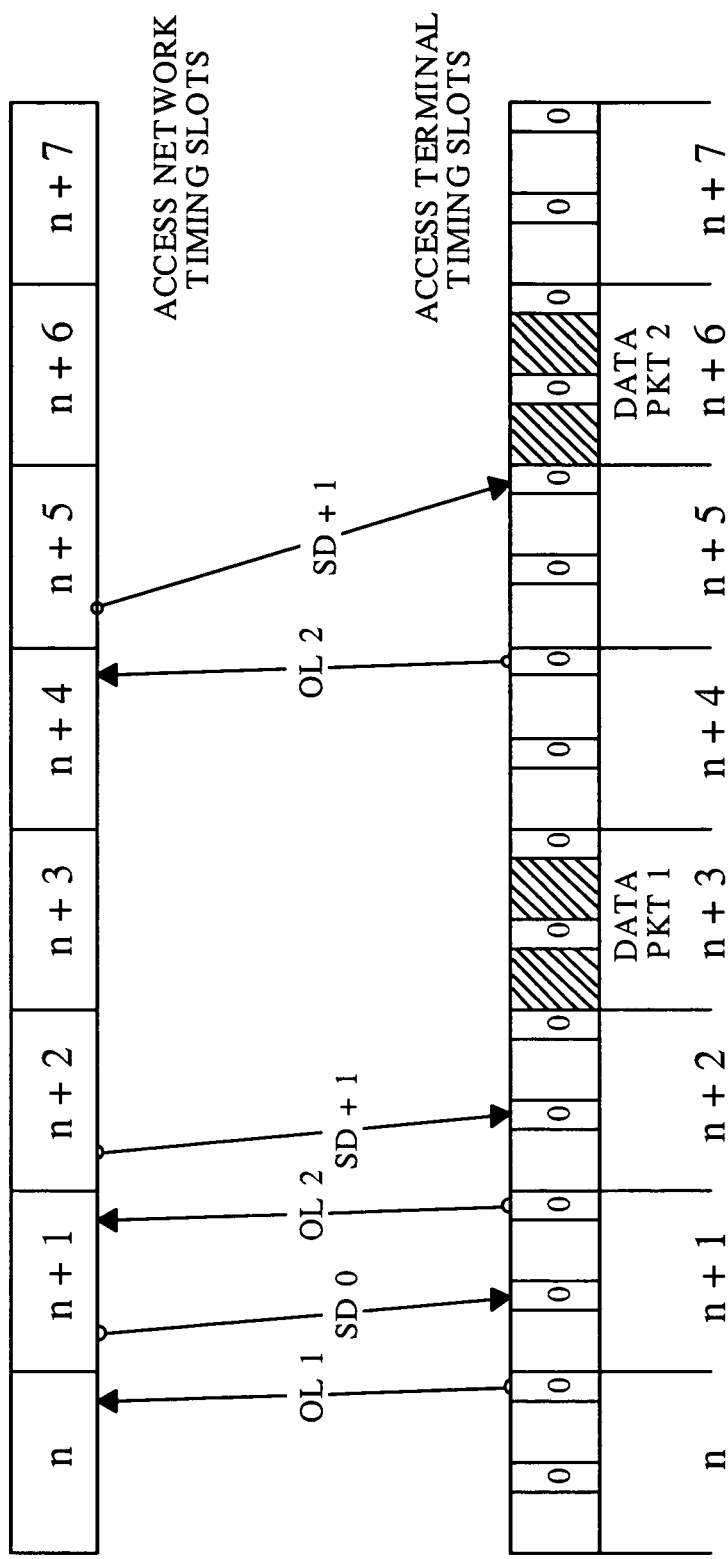
FIG. 6 illustrates a reverse link data transmission.

One example of the reverse link data transmission is shown and will be explained with reference to FIG. 6. FIG. 6 illustrates reverse link data transmission negotiation for one access terminal for the sake of understanding only, to extend the concept to multiple access terminals. Furthermore, only the serving access point is shown. It is understood from a previous description, how the ACK and NACK transmission from non-serving terminals affect the reverse link data transmission.

Because the access procedure, serving sector selection, and other call setup procedures are based on the like functions of the communication system in accordance with the IS-856 standard as described above, they are not repeated. The access terminal (not shown) having received data to be transmitted evaluates the access terminal's reverse link quality metric and impatient function, and generates an opportunity level (OL 1). The access terminal further generates the packet data type and estimates the data rate. As discussed, the packet data type designates the packet as original or re-transmitted. As described in more detail below, the rate determination method determines maximum supportable rate in accordance with the access terminal's maximum transmit power, transmit power allocated to a pilot channel and an amount of data to be transmitted. The access terminal then communicates the packet data type and the requested data rate over the RRI channel, and the opportunity level over the PR channel of the reverse link in slot n.

A serving access point (not shown) of the access network receives the reverse link and decodes the information contained in slot n. The serving access point then provides the opportunity level, the packet data type, and the requested data rate of all access terminals requesting permission to transmit data to a scheduler (not shown). The scheduler schedules packets for transmissions in accordance with scheduling rules. As discussed, the scheduling rules attempt to minimize mutual reverse link interference among access terminals while achieving the required QoS or data distribution fairness. The rules are as follows:

i. precedence to transmit is given to the access terminal reporting the highest opportunity level;
ii. in the event that several access terminals report identical opportunity level, precedence is given to the access terminal with lower transmitted throughput;
iii. in the event that several access terminals satisfy rules (i) and (ii) the access terminal is selected at random; and
iv. a permission to transmit is given to one of the access terminals with data available for transmission even if the reported opportunity level is low in order to maximize reverse link utilization.

After having made scheduling decision, the serving access point transmits the scheduling decision for each of the access terminals requesting permission to transmit on the PG channel.

The access terminal receives the PG channel, decodes the scheduling decision SD 0, and abstains from packet transmission. Because the access terminal has data to be transmitted, the access terminal again evaluates the access terminal's reverse link quality metric and impatience function, and this time generates an opportunity level (OL 2). The access terminal further generates the packet data type and estimates the data rate, and provides the packet data type and the requested data rate over a RRI channel, and the opportunity level over the PR channel of the reverse link in slot n+1.

The serving access point receives the reverse link and decodes the information contained in slot n+1. The serving access point then provides the opportunity level, the packet data type, and the requested data rate of all access terminals requesting permission to transmit data to the scheduler. After having made scheduling decision, the serving access point transmits the scheduling decision for each of the access terminals requesting permission to transmit on the PG channel. As shown in FIG. 6, the serving access point transmits a scheduling decision SD +1 granting the access terminal permission to transmit a new packet.

The access terminal receives the PG channel and decodes the scheduling decision SD +1. The access terminal evaluates the access terminal's reverse link quality metric and impatience function. As illustrated in FIG. 6, the access terminal determined an opportunity level equal to 0, i.e., no data available for transmission, consequently, the access terminal does not transmit PR channel in time-slot n+2. Likewise, the access terminal determined an opportunity level equal to 1 for slot n+3, consequently, the access terminal, transmits the user data in the payload portions of the reverse link traffic channel in the opportune time-slot n+3.

At time-slot n+4, the access terminal has data to be transmitted. The access terminal evaluates the access terminal's reverse link quality metric and impatience function, and generates an opportunity level (OL 2). The access terminal further generates the packet data type and estimates the data rate, and provides the packet data type and the requested data rate over a RRI channel, and the opportunity level over the PR channel of the reverse link in slot n+4.

The serving access point receives the reverse link and decodes the information contained in slot n+4. The serving access point then provides the opportunity level, the packet data type, and the requested data rate of all access terminals requesting permission to transmit data to the scheduler. After having made scheduling decision, the serving access point transmits the scheduling decision for each of the access terminals requesting permission to transmit on the PG channel. As shown in FIG. 6, the payload send over the reverse link in slot n+3 was correctly decoded at the access network. Consequently, the serving access point transmits a scheduling decision SD +1 granting the access terminal permission to transmit a new packet.

Only the serving access point receives and decodes the reverse link from the transmitting access terminal, consequently, the serving access point scheduler makes the scheduling decision solely on the information provided by the serving access point. The other access points of the access network also receive and decode the reverse link from the transmitting access terminal and provide information whether the payload was successfully decoded to the serving access point. Consequently, if any of the access points of the access network successfully decoded the payload, the serving access point indicates an ACK over the PG channel, thus preventing unnecessary re-transmission. All the access points that received the payload information send the payload information to centralized entity to perform soft-decision decoding. The central decoder then notifies the serving access point whether the payload decoding was successful.

The access terminal receives the PG channel and decodes the scheduling decision SD +1. The access terminal evaluates the access terminal's reverse link quality metric and impatience function. As illustrated in FIG. 6, the access terminal determined an opportunity level equal to 0, i.e., no data available for transmission, consequently, the access terminal does not transmit PR channel in time-slot n+5. Likewise, the access terminal determined an opportunity level equal to 1 for slot n+6, consequently, the access terminal, transmits the user data in the payload portions of the reverse link traffic channel in the opportune time-slot n+6.

Figure 7:
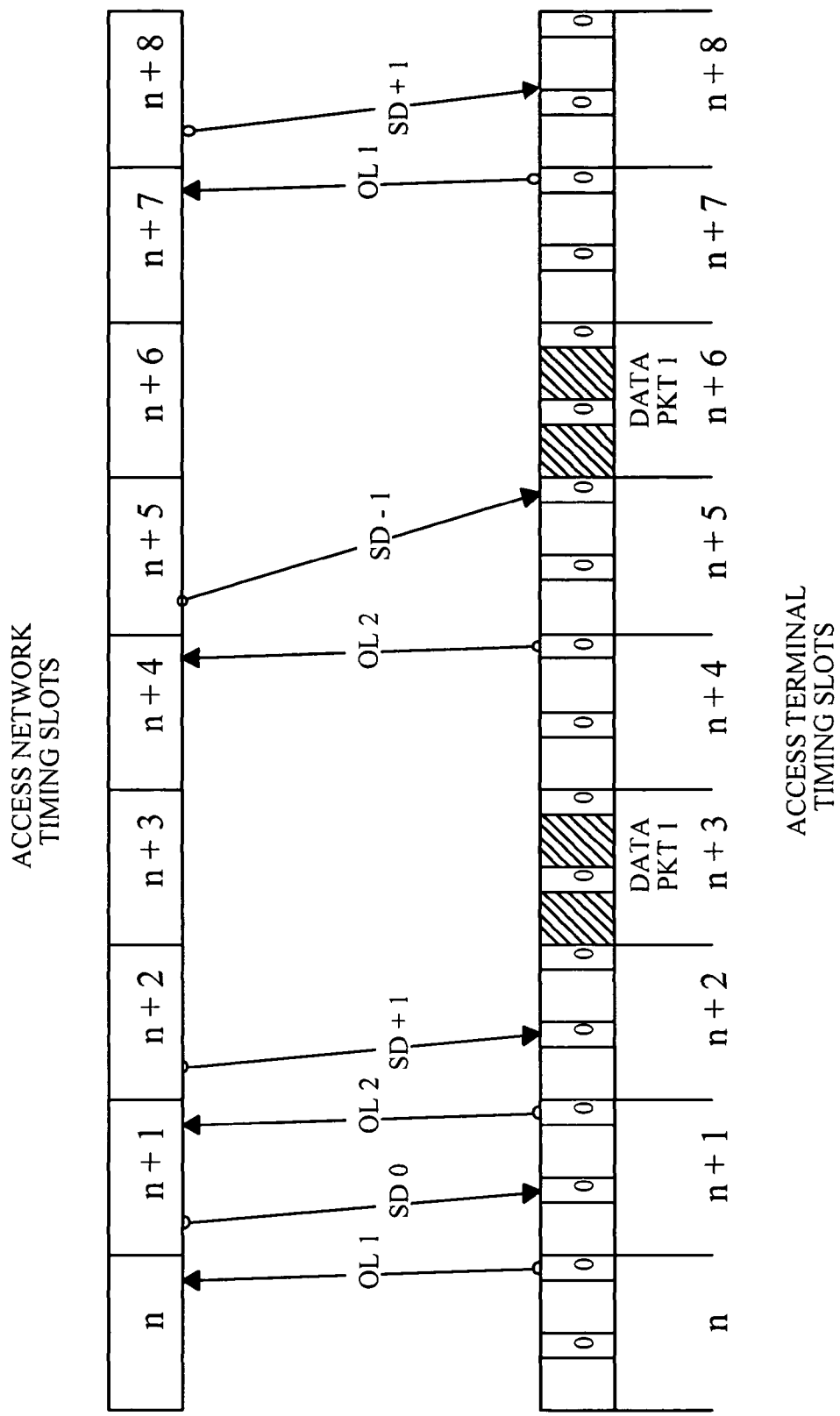
FIG. 7 illustrates a reverse link data re-transmission.

The case for the access network failing to correctly decode the payload sent over the reverse link in slot n+3 is illustrated in FIG. 7. To request re-transmission of the payload sent over the reverse link in slot n+3, the serving access point communicates over the PG a scheduling decision SD −1 granting the access terminal permission to retransmit the old packet.

The access terminal receives the PG channel and decodes the scheduling decision SD −1. The access terminal evaluates the access terminal's reverse link quality metric and impatience function. As illustrated in FIG. 7, the access terminal determined an opportunity level equal to 0, i.e., no data available for transmission, consequently, the access terminal does not transmit PR channel in time-slot n+5. Likewise, the access terminal determined an opportunity level equal to 1 for slot n+6, consequently, the access terminal, transmits the user data in the payload portions of the reverse link traffic channel in the opportune time-slot n+6.

At time-slot n+7, the access terminal has data to be transmitted. The access terminal evaluates the access terminal's reverse link quality metric and impatience function, and generates an opportunity level (OL 1). The access terminal further generates the packet data type and estimates the data rate, and provides the packet data type and the requested data rate over a RRI channel, and the opportunity level over the PR channel of the reverse link in slot n+7.

The serving access point receives the reverse link and decodes the information contained in slot n+6. The serving access point then provides the opportunity level, the packet data type, and the requested data rate of all access terminals requesting permission to transmit data to the scheduler. After having made scheduling decision, the serving access point transmits the scheduling decision for each of the access terminals requesting permission to transmit on the PG channel. As shown in FIG. 7, the retransmitted payload sent over the reverse link in slot n+6 was correctly decoded at the access network. Consequently, in response to the access terminal's opportunity level sent in time-slot n+7, the serving access point transmits a scheduling decision SD +1 granting the access terminal permission to transmit a new packet.

It will be appreciated that the serving access point may schedule an access terminal in accordance with their latest received request for transmission.

It will be appreciated that the packet access network may not receive the data packet even upon several re-transmission attempts. To prevent excessive re-transmission attempts, the communication system may give up re-transmission attempts after a determined number of re-transmission attempts (persistence interval). The missing packet is then handled by a different method, e.g., a radio link protocol (RLP).

Reverse Link Power Control

As discussed, only one access terminal in a sector is transmitting data traffic on the reverse link. Because in the CDMA communication system all terminals are transmitting on the same frequency, each transmitting access terminal acts as a source of interference to the access terminals in adjacent sectors. To minimize such an interference on the reverse link and maximize capacity, the transmit power of the pilot channel for each access terminal is controlled by two power control loops. The transmit power of the remaining overhead channels is then determined as a fraction of the transmit power of the pilot channel. The transmit power of the traffic channel is determined as a traffic-to-pilot power ratio for a given data rate, corrected by a rise over thermal differential between the overhead and traffic transmission intervals. Rise over thermal is a difference between a receiver noise floor and a total received power as measured by the access terminal.

Pilot Channel Power Control

The pilot channel power control loops are similar to that of the CDMA system disclosed in detail in U.S. Pat. No. 5,056,109, entitled "METHOD AND APPARATUS FOR CONTROLLING TRANSMISSION POWER IN A CDMA CELLULAR MOBILE TELEPHONE SYSTEM," assigned to the present assignee and incorporated by reference herein. Other power control methods are also contemplated and are within the scope of the present invention.

The first power control loop (outer loop), adjusts a set point so that a desired level of performance, e.g., a DRC channel erasure rate, is maintained. The set point is updated every two frames following selection diversity at the access points, i.e., the set point is increased only if the measured DRC erasure rate exceeds a threshold at all the access points in the active set of the access terminal, and decreased if the measured DRC erasure rate is below the threshold at any of the access points.

The second power control loop (inner loop) adjusts the transmit power of the access terminal so that the reverse link quality metric is maintained at the set point. The quality metric comprises an energy-per-chip-to-noise-plus-interference ratio (Ecp/Nt), and is measured at the access point receiving the reverse link. Consequently, the set point is also measured in Ecp/Nt. The access point compares the measured Ecp/Nt with the power control set point. If the measured Ecp/Nt is greater than the set point, the access point transmits a power control message to the access terminal to decrease the access terminal's transmit power. Alternatively, if the measured Ecp/Nt is below the set point, the access point transmits a power control message to the access terminal to increase the access terminal's transmit power. The power control message is implemented with one power control bit. A first value for the power control bit ("up") commands the access terminal to increase the access terminal's transmit power and a low value ("down") commands access terminal to decrease the access terminal's transmit power.

The power control bits for all access terminals in communication with each access point are transmitted on the RPC of the forward link.

Remaining Overhead Channel Power Control

Once the transmit power of the pilot channel for a time-slot is determined by the operation of the power control loops, the transmit power of each of the remaining overhead channels is determined as a ratio of the transmit power of the specific overhead channel to the transmit power of the pilot channel. The ratios for each overhead channel are determined in accordance with simulations, laboratory experiments, field trials and other engineering methods.

Traffic Channel Power Control

The required transmit power of the traffic channel is also determined in accordance with the transmit power of the pilot channel. The required traffic channel power is computed using the following formula:

$$P_t = P_{pilot} \cdot G(r) \cdot A \quad (3)$$

where:
Pt is the transmit power of the traffic channel;
Ppilot is the transmit power of the pilot channel;
G(r) is a traffic-to-pilot transmit power ratio for a given data rate r; and
A is a rise over thermal (ROT) differential between the overhead and traffic transmission intervals.

The measurement of the ROT in the overhead transmission interval (ROToverhead) and the traffic (ROTtraffic) transmission interval, needed for calculation of A at the access point is disclosed in U.S. Pat. No. 6,192,249 entitled "Method and Apparatus For Reverse Link Loading Estimation," assigned to the present assignee. Once the noise in both the overhead and traffic transmission intervals are measured, the A is computed using the following formula:

$$A = ROT_{traffic} - ROT_{overhead} \quad (4)$$

The computed A is then transmitted to the access terminal. A is transmitted over the RA channel. The value of A is then adjusted by the access terminal in accordance with the reverse link packet error rate (PER) determined in accordance with the ACK/NAK received from the access point, on the PG channel, so that a determined PER is maintained in a maximum allowed number of transmissions of a given packet. The reverse link packet error rate is determined in accordance with ACK/NACK of the reverse link packets. The value of A is increased by a first determined amount if an ACK has been received within N re-transmission attempts of the maximum M re-transmission attempts. Similarly, the value of A is decreased by a second determined amount if an ACK has not been received within N re-transmission attempts of the maximum M re-transmission attempts.

Alternatively, A represents an estimate of the ROT differential given by Equation (4) at a subscriber station. An initial value of A is determined in accordance with simulations, laboratory experiments, field trials and other suitable engineering methods. The value of A is then adjusted in accordance with the reverse link packet error rate (PER) so that a determined PER is maintained in a maximum allowed number of transmissions of a given packet. The reverse link packet error rate is determined in accordance with ACK/NACK of the reverse link packets as described above. The value of A is increased by a first determined amount if an ACK has been received within N re-transmission attempts of the maximum M re-transmission attempts. Similarly, the value of A is decreased by a second determined amount if an ACK has not been received within N re-transmission attempts of the maximum M re-transmission attempts.

From Equation (3) it follows that the traffic channel transmit power is a function of the data rate r. Additionally, an access terminal is constrained in maximum amount of transmit power (Pmax). Therefore, the access terminal initially determines how much power is available from the Pmax and the determined Ppilot. The access terminal then determines the amount of data to be transmitted, and selects the data rate r in accordance with the available power and the amount of data. The access terminal then evaluates Equation (3) to determine, whether the effect of the estimated noise differential A did not result in exceeding the available power. If the available power is exceeded, the access terminal decreases the data rate r and repeats the process.

The access point can control the maximum data rate that an access terminal can transmit by providing the access terminal with a maximum allowed value G(r)·A via the RA channel. The access terminal then determines the maximum amount of transmit power of the reverse link traffic channel, the transmit power of the reverse link pilot channel, and uses Equation (3) to calculate the maximum data rate that can be transmitted.

RRI Channel Power Control

As discussed above, the transmit power of the overhead channels is determined as a ratio of the transmit power of the specific overhead channel to the transmit power of the pilot channel.

To avoid the need to transmit the RRI portion of the traffic/RRI channel time-slot at a different power level than the traffic portion, the traffic/RRI channel portion of the time-slot is transmitted at the same power. To achieve the correct power distribution for the RRI channel, a different number of chips is allocated to the RRI channel as a function of the transmitted data rate.

To ensure correct decoding of a determined number of chips comprising a Walsh covered codeword, a required power can be determined. Alternatively, if the power for traffic/payload necessary for a transmission is known, and the RRI portion of the traffic/RRI channel time-slot is transmitted at the same power, the number of chips adequate for reliable RRI channel decoding can be determined. Consequently, once the data rate, and, therefore, the power for transmission of the traffic/RRI channel time-slot is determined, so is the number of chips allocated to the RRI channel. The access terminal generates the RRI channel bits, encodes the bits to obtain symbols, and fills the number of chips allocated to the RRI channel with the symbols. If the number of chips allocated to the RRI channel is greater than the number of symbols, the symbols are repeated until all the chips allocated to the RRI channel are filled.

Alternatively, the RRI channel is time-division-multiplexed with the traffic channel payload and the RRI portion of the traffic/RRI channel time-slot comprises a fixed number of chips. Furthermore, the power level of the RRI channel is not determined in accordance with the transmit power of the pilot channel, but is assigned a fixed value in accordance with a desired QoS, and is communicated to each access terminal by an access point. The fixed value for a desired quality metric of RRI channel reception is determined in accordance with simulations, laboratory experiments, field trials and other engineering methods.

Figure 8:
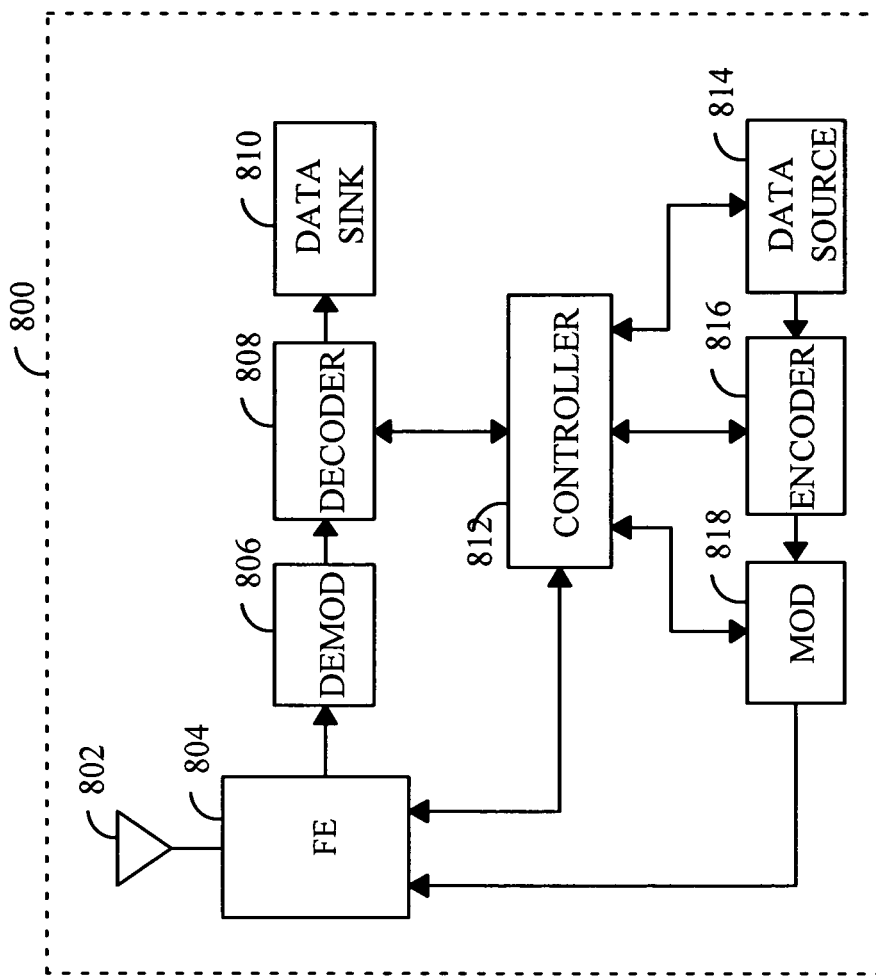
FIG. 8 illustrates a subscriber station.

Access terminal 800 is illustrated in FIG. 8. Forward link signals are received by antenna 802 and routed to a front end 804 comprising a receiver. The receiver filters, amplifies, demodulates, and digitizes the signal provided by the antenna 802. The digitized signal is provided to demodulator (DEMOD) 806, which provides demodulated data to decoder 808. Decoder 808, performs the inverse of the signal processing functions done at an access point, and provides decoded user data to data sink 810. The decoder further communicates with a controller 812, providing to the controller 812 overhead data. The controller 812 further communicates with other blocks comprising the access terminal 800 to provide proper control of the operation of the access terminal's 800, e.g., data encoding, power control. Controller 812 can comprise, e.g., a processor and a storage medium coupled to the processor and containing a set of instructions executable the processor.

The user data to be transmitted by the access terminal are provided by a data source 814 by direction of the controller 812 to an encoder 816. The encoder 816 is further provided with overhead data by the controller 812. The encoder 816 encodes the data and provides the encoded data to a modulator (MOD) 818. The data processing in the encoder 816 and the modulator 818 is carried out in accordance with reverse link generation as described in the text and figures above. The processed data is then provided to a transmitter within the front end 804. The transmitter modulates, filters, amplifies, and transmits the reverse link signal over the air, through antenna 802, on reverse link.

Figure 9:
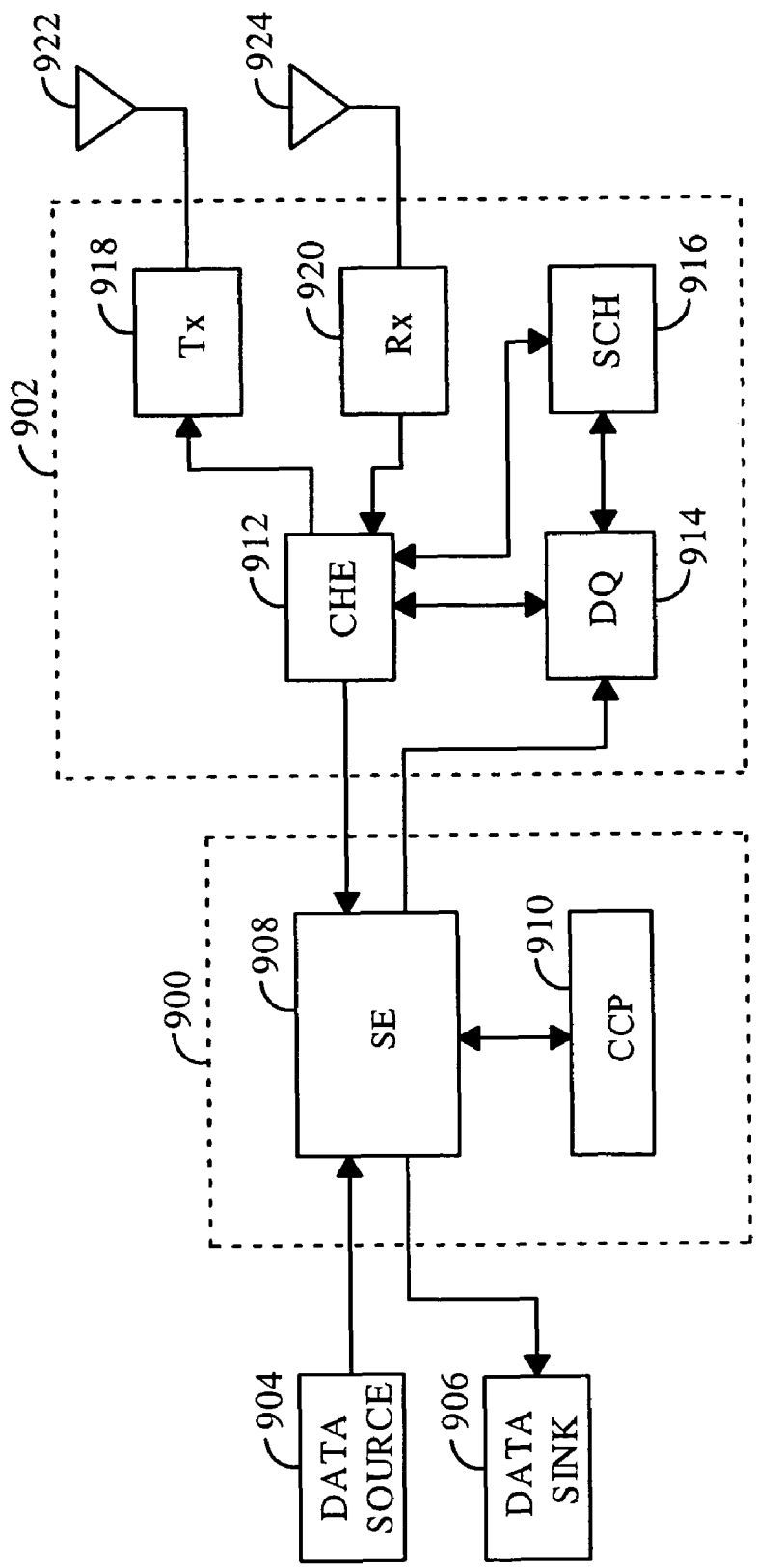
FIG. 9 illustrates a controller and an access terminal.

A controller 900 and an access point 902 is illustrated in FIG. 9. The user data generated by a data source 904, are provided via an interface unit, e.g., a packet network interface, PSTN, (not shown) to the controller 900. As discussed, the controller 900 interfaces with a plurality of access point, forming an access network. (Only one assess point 902 is shown in FIG. 9 for simplicity). The user data are provided to a plurality of selector elements (only one selector element 908 is shown in FIG. 9 for simplicity). One selector element is assigned to control the user data exchange between the data source 904 and data sink 906 and one or more base stations under the control of a call control processor 910. The call control processor 910 can comprise, e.g., a processor and a storage medium coupled to the processor and containing a set of instructions executable the processor. As illustrated in FIG. 9, the selector element 908 provides the user data to a data queue 914, which contains the user data to be transmitted to access terminals (not shown) served by the access point 902. In accordance with the control of a scheduler 916, the user data is provided by the data queue 914 to a channel element 912. The channel element 912 processes the user data in accordance with the IS-856 standard, and provides the processed data to a transmitter 918. The data is transmitted over the forward link through antenna 922.

The reverse link signals from access terminals (not shown) are received at the antenna 924, and provided to a receiver 920. Receiver 920 filters, amplifies, demodulates, and digitizes the signal, and provides the digitized signal to the channel element 912. The channel element 916 performs the inverse of the signal processing functions done at an access point, and provides decoded data to selector element 908. Selector element 908 routes the user data to a data sink 906, and the overhead data to the call control processor 910.

It will be appreciated that although the flowchart diagrams are drawn in sequential order for comprehension, certain steps can be carried out in parallel in an actual implementation.

It will be appreciated that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

It would be further appreciated that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executable by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications will be readily apparent to those skilled in the art, and the generic principles defined herein may be applied without departing from the scope of the embodiments. Thus, the present invention is not intended to be limited to the embodiments shown herein but is to be accorded the widest scope consistent with the principles and novel features disclosed herein.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The invention claimed is:

1. A method, implemented in an apparatus, for scheduling data transmission, comprising:
   determining an opportunity level for an interval in accordance with at least one of an instantaneous quality metric of a reverse link channel in the interval, an average quality metric of the reverse link channel, and an impatience function;
   transmitting a request for transmission in the interval, the request comprising the opportunity level; and
   receiving a scheduling decision for data transmission on the reverse link channel in response to the request.

2. The method of claim 1, further comprising transmitting the request in a connected state of an access terminal.

3. The method of claim 1, further comprising:
   determining the opportunity level for a pre-determined interval; and
   transmitting the opportunity level and an interval indicator.

4. The method of claim 1, wherein the impatience function is determined in accordance with at least one of a maximum acceptable transmission delay, a number of packets in a queue at an access terminal, and an average throughput of the reverse link.

5. The method of claim 1, further comprising:
   transmitting data in accordance with the scheduling decision.

6. The method of claim 1, wherein the interval includes one or more predetermined intervals.

7. An apparatus adapted for scheduling data transmission, comprising:
   means for determining an opportunity level for an interval in accordance with at least one of an instantaneous quality metric of a reverse link channel in the interval, an average quality metric of the reverse link channel, and an impatience function;
   means for transmitting a request for transmission in the interval, the request comprising the opportunity level; and
   means for receiving a scheduling decision for data transmission on the reverse link channel in response to the request.

8. The apparatus of claim 7, further comprising means for transmitting the request in a connected state of an access terminal.

9. The apparatus of claim 7, further comprising:
   means for determining the opportunity level for a predetermined interval; and
   means for transmitting the opportunity level and an interval indicator.

10. The apparatus of claim 7, wherein the impatience function is determined in accordance with at least one of a maximum acceptable transmission delay, a number of packets in a queue at an access terminal, and an average throughput of the reverse link.

11. The apparatus of claim 7, further comprising:
    means for transmitting data in accordance with the scheduling decision.

12. A method, implemented in an apparatus, for data transmission, comprising:
    receiving at least one request for transmission in an interval, the request comprising an opportunity level indicative of at least one of an instantaneous quality metric of a reverse link channel in the interval, an average quality metric of the reverse link channel, and an impatience function; and
    transmitting a scheduling decision for data transmission on the reverse link channel in response to the at least one request.

13. The method of claim 12, further comprising receiving at least one opportunity level and at least one interval indicator.

14. The method of claim 12, the method further comprising determining the scheduling decision in accordance with scheduling rules comprising:
    giving a precedence to a request containing a highest opportunity level; and
    giving a precedence to a request from an access terminal with a lower transmitted throughput when a plurality of the at least one request contain an identical opportunity level.

15. The method of claim 14, wherein the scheduling rules further comprise giving a precedence at random, if no precedence is established.

16. An apparatus adapted for scheduling data transmission, comprising:
    means for receiving at least one request for transmission in an interval, the request comprising an opportunity level indicative of at least one of an instantaneous quality metric of a reverse link channel in the interval, an average quality metric of the reverse link channel, and an impatience function; and
    means for transmitting a scheduling decision for data transmission on the reverse link channel in response to the at least one request.

17. The apparatus of claim 16, further comprising means for receiving at least one opportunity level and at least one interval indicator.

18. The apparatus of claim 16, further comprising means for determining the scheduling decision in accordance with scheduling rules comprising:
    giving a precedence to a request containing a highest opportunity level; and giving a precedence to a request from an access terminal with a lower transmitted throughput when a plurality of the at least one request containing an identical opportunity level.

19. The apparatus of claim 18, wherein the scheduling rules further comprise giving a precedence at random, if no precedence is established.

20. A non-transitory, computer-readable medium encoded thereon with instructions that when executed cause an apparatus to carry out a method for transmitting data, the method comprising:
  determining an opportunity level for an interval in accordance with at least one of an instantaneous quality metric of a reverse link channel in the interval, an average quality metric of the reverse link channel, and an impatience function;
  transmitting a request for transmission in the interval, the request comprising the opportunity level; and
  receiving a scheduling decision for data transmission on the reverse link channel in response to the request.

21. The non-transitory, computer-readable medium of claim 20, wherein the method further comprises transmitting the request in a connected state of an access terminal.

22. The non-transitory, computer-readable medium of claim 20, wherein the method further comprises:
  determining the opportunity level for a pre-determined interval; and
  transmitting the opportunity level and an interval indicator.

23. The non-transitory, computer-readable medium of claim 20, wherein the impatience function is determined in accordance with at least one of a maximum acceptable transmission delay, a number of packets in a queue at an access terminal, and an average throughput of the reverse link.

24. The non-transitory, computer-readable medium of claim 20, wherein the method further comprises:
  transmitting data in accordance with the scheduling decision.

25. A non-transitory, computer-readable medium encoded thereon with instructions that when executed cause an apparatus to carry out a method for scheduling data transmission, the method comprising:
  receiving at least one request for transmission in an interval, the request comprising an opportunity level indicative of at least one of an instantaneous quality metric of a reverse link channel in the interval, an average quality metric of the reverse link channel, and an impatience function; and
  transmitting a scheduling decision for data transmission on the reverse link channel in response to the at least one request.

26. The non-transitory, computer-readable medium of claim 25, wherein the method further comprises receiving at least one opportunity level and at least one interval indicator.

27. The non-transitory, computer-readable medium of claim 25, wherein the method further comprises determining the scheduling decision in accordance with scheduling rules comprising:
  giving a precedence to a request containing a highest opportunity level; and
  giving a precedence to a request from an access terminal with a lower transmitted throughput when a plurality of the at least one request contain an identical opportunity level.

28. The non-transitory, computer-readable medium of claim 27, wherein the scheduling rules further comprise scheduling the transmission at random, if no precedence is established.

29. A communication device comprising:
  a controller; and
  a transmitter coupled to the controller;
  wherein the controller includes instructions comprising:
    determine an opportunity level for an interval in accordance with at least one of an instantaneous quality metric of a reverse link channel in the interval, an average quality metric of the reverse link channel, and an impatience function;
    transmit a request for transmission in the interval, the request comprising the opportunity level; and
    receive a scheduling decision for data transmission on the reverse link channel in response to the request.

30. The communication device of claim 29, wherein the instructions further comprise transmit the request in a connected state of an access terminal.

31. The communication device of claim 29, wherein the instructions further comprise:
  determine the opportunity level for a pre-determined interval; and
  transmit the opportunity level and an interval indicator.

32. The communication device of claim 29, wherein the impatience function is determined in accordance with at least one of a maximum acceptable transmission delay, a number of packets in a queue at an access terminal, and an average throughput of the reverse link.

33. The communication device of claim 29, wherein the instructions further comprise transmit data in accordance with the scheduling decision.

34. An apparatus for scheduling data transmission, comprising:
  a controller; and
  a transmitter coupled to the controller;
  wherein the controller includes instructions comprising:
    receive at least one request for transmission in an interval, the request comprising an opportunity level indicative of at least one of an instantaneous quality metric of a reverse link channel in the interval, an average quality metric of the reverse link channel, and an impatience function; and
    transmit a scheduling decision for data transmission on the reverse link channel in response to the at least one request.

35. The apparatus of claim 34, wherein the instructions further comprise receive at least one opportunity level and at least one interval indicator.

36. The apparatus of claim 34, wherein the instructions further comprise determining the scheduling decision in accordance with scheduling rules comprising:
  giving a precedence to a request containing a highest opportunity level; and
  giving a precedence to a request from an access terminal with a lower transmitted throughput when a plurality of the at least one request containing an identical opportunity level.

37. The apparatus of claim 36, wherein the scheduling rules further comprise giving a precedence at random, if no precedence is established.

* * * * *